(12) United States Patent
Koyama et al.

(10) Patent No.: US 8,887,588 B2
(45) Date of Patent: Nov. 18, 2014

(54) TRANSMISSION

(75) Inventors: Shigeru Koyama, Wako (JP); Mitsuru Torihata, Wako (JP); Nobuhiro Kumagai, Wako (JP); Hitoshi Tsukuda, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 702 days.

(21) Appl. No.: 13/129,970

(22) PCT Filed: Oct. 19, 2009

(86) PCT No.: PCT/JP2009/068001
§ 371 (c)(1),
(2), (4) Date: May 18, 2011

(87) PCT Pub. No.: WO2010/070976
PCT Pub. Date: Jun. 24, 2010

(65) Prior Publication Data
US 2011/0214533 A1   Sep. 8, 2011

(30) Foreign Application Priority Data

Dec. 16, 2008 (JP) ................................ 2008-320100
Jul. 21, 2009 (JP) ................................ 2009-170568

(51) Int. Cl.
*F16H 3/08* (2006.01)
*F16H 3/00* (2006.01)
(Continued)

(52) U.S. Cl.
CPC ............... *F16H 3/006* (2013.01); *B60W 10/02* (2013.01); *B60W 10/06* (2013.01); *B60W*
(Continued)

(58) Field of Classification Search
CPC ......... F16H 3/006; F16H 3/089; F16H 3/093; F16H 3/095; F16H 2003/0931; F16H 2200/0052; F16H 2200/0056; F16H 2200/006; F16H 2200/0065; F16H 2200/0047; B60K 6/48

USPC ............ 74/329–331, 333, 661, 665 A–665 B, 74/665 D–665 F, 665 G
See application file for complete search history.

(56) References Cited

U.S. PATENT DOCUMENTS 5,720,203 A     2/1998 Honda et al.
7,044,014 B2 *  5/2006 Janson et al. ................... 74/331
(Continued)

FOREIGN PATENT DOCUMENTS

DE     10225331 A1    12/2003
EP     0 756 107 A2    1/1997
(Continued)

OTHER PUBLICATIONS

Supplementary European Search Report dated Mar. 22, 2012, issued in corresponding European Patent Application No. 09833281.

(Continued)

*Primary Examiner* — Troy Chambers
*Assistant Examiner* — Alexander Vu
(74) *Attorney, Agent, or Firm* — Westerman, Hattori, Daniels & Adrian, LLP

(57) ABSTRACT

A twin clutch type transmission in which, when establishing a reverse gear position, the driving force of an engine (E) is transmitted to driven wheels (W, W) via the path: even-numbered gear clutch (Ce)→second input shaft (13)→second input shaft gear (22)→idle shaft second gear (42)→idle shaft first gear (41)→first countershaft first gear (23)→first countershaft (14)→first countershaft second gear (24)→third countershaft second gear (34)→first speed-third speed synchronizing device (36)→third countershaft (16)→third countershaft third gear (35)→second output shaft gear (46)→second output shaft (19)→final drive gear (44)→final driven gear (48)→differential gear (47). When establishing a first speed gear position by engaging an odd-numbered gear clutch (Co), the whole of the driving force transmission path on the downstream side of the first countershaft first gear (23) is shared with that when establishing the reverse gear position, thus enabling the weight and dimensions of the transmission to be reduced effectively.

2 Claims, 18 Drawing Sheets

(51) Int. Cl.
    *B60W 10/02*     (2006.01)
    *B60W 10/06*     (2006.01)
    *B60W 10/113*     (2012.01)
    *B60W 30/18*     (2012.01)
    *F16H 3/091*     (2006.01)
    *F16H 3/093*     (2006.01)

(52) U.S. Cl.
    CPC 10/113 (2013.01); *B60W 30/18036* (2013.01); *F16H 3/091* (2013.01); *F16H 3/093* (2013.01); *F16H 2003/0803* (2013.01); *F16H 2003/0938* (2013.01); *F16H 2200/0026* (2013.01); *F16H 2200/0043* (2013.01); *F16H 2200/006* (2013.01)
    USPC .............................................. 74/330; 74/329

(56) References Cited

U.S. PATENT DOCUMENTS

2006/0230854 A1* 10/2006 Enstrom et al. ................ 74/331
2007/0266810 A1* 11/2007 Forsyth ........................... 74/331
2008/0000312 A1* 1/2008 Lang et al. ...................... 74/340
2008/0134820 A1* 6/2008 Bjorck et al. ................... 74/331
2008/0196526 A1* 8/2008 Singh et al. .................... 74/331
2008/0202266 A1* 8/2008 Hendrickson et al. .......... 74/331
2008/0202267 A1* 8/2008 Hendrickson et al. .......... 74/331
2011/0214533 A1* 9/2011 Koyama et al. ............. 74/665 A

FOREIGN PATENT DOCUMENTS

| | | |
|---|---|---|
| FR | 2880094 A1 | 6/2006 |
| JP | 61-286644 A | 12/1986 |
| JP | 9-042387 A | 2/1997 |
| JP | 2002-364718 A | 12/2002 |
| JP | 2003-120764 A | 4/2003 |
| JP | 2008-069832 A | 3/2008 |
| JP | 2008069832 * | 3/2008 |
| JP | 2008069832 A * | 3/2008 |
| WO | 2007/139683 A2 | 12/2007 |

OTHER PUBLICATIONS

Chinese Office Action dated Apr. 1, 2013, issued in corresponding Chinese Patent Application No. 200980142805.7.

International Search Report for PCT/JP2009/068001, mailed on Jan. 26, 2010.

\* cited by examiner

LOW

| | | CLUTCH | | SYNCHRONIZING DEVICE | | | | | | | | |
|---|---|---|---|---|---|---|---|---|---|---|---|---|
| | | ODD-NUMBERED | EVEN-NUMBERED | LOW | 2ND | 3RD | 4TH | 5TH | 6TH | 7TH | 8TH | RVS |
| GEAR POSITION | LOW | ● | ○ | ● | ○ | ○ | ○ | ○ | ○ | ○ | ○ | ○ |
| | 2ND | ○ | ● | ○ | ● | ○ | ○ | ○ | ○ | ○ | ○ | ○ |
| | 3RD | ● | ○ | ○ | ○ | ● | ○ | ○ | ○ | ○ | ○ | ○ |
| | 4TH | ○ | ● | ○ | ○ | ○ | ● | ○ | ○ | ○ | ○ | ○ |
| | 5TH | ● | ○ | ○ | ○ | ○ | ○ | ● | ○ | ○ | ○ | ○ |
| | 6TH | ○ | ● | ○ | ○ | ○ | ○ | ○ | ● | ○ | ○ | ○ |
| | 7TH | ● | ○ | ○ | ○ | ○ | ○ | ○ | ○ | ● | ○ | ○ |
| | 8TH | ○ | ● | ○ | ○ | ○ | ○ | ○ | ○ | ○ | ● | ○ |
| | RVS | ○ | ● | ● | ○ | ○ | ○ | ○ | ○ | ○ | ○ | ● |

● : OPERATION
○ : NON-OPERATION

TRANSMISSION

TECHNICAL FIELD

The present invention relates to a so-called twin clutch type transmission in which an engine driving force is selectively distributed between first and second auxiliary input shafts via first and second clutches.

BACKGROUND ART

In a twin clutch type automatic transmission in which forward first speed to forward eighth speed gear positions and a reverse gear position can be established, an arrangement in which when establishing the forward second speed gear position and when establishing the reverse gear position a second speed output gear 48b provided on a second output shaft 22 is shared, when establishing the forward second speed gear position the driving force is transmitted from a second speed input gear 48a provided on a second input shaft 18 to the second speed output gear 48b, and when establishing the reverse gear position the driving force is transmitted from an idler gear 60 provided on a second countershaft (idle shaft) 26 to the second speed output gear 48b is known from Patent Document 1 below.

Patent Document 1: Japanese Patent Application Laid-open No. 2008-69832

DISCLOSURE OF THE INVENTION

Problems to be Solved by the Invention

In the above-mentioned conventional arrangement, when establishing the forward second speed gear position and when establishing the reverse gear position the second speed output gear 48b provided on the second output shaft 22 is shared, but since the second speed input gear 48a for transmitting the driving force to the second speed output gear 48b when establishing the forward second speed gear position and the idler gear 60 for transmitting the driving force to the second speed output gear 48b when establishing the reverse gear position are individually provided, the driving force transmission path that can be shared by the second speed gear position and the reverse gear position is very limited, and there is the problem that the effect in reducing weight or dimensions due to the driving force transmission path being shared is not sufficient.

The present invention has been accomplished in light of the above-mentioned circumstances, and it is an object thereof to reduce the weight or dimensions of a twin clutch type transmission by sharing as much as possible the driving force transmission path for a predetermined forward side gear position and a reverse gear position.

Means for Solving the Problems

In order to attain the above object, according to a first aspect of the present invention, there is provided a transmission comprising a first input shaft and a second input shaft disposed coaxially with each other, a first clutch for transmitting the driving force of an engine to the first input shaft, a second clutch for transmitting the driving force of the engine to the second input shaft, a first countershaft, a second countershaft, and an idle shaft disposed in parallel to the first and second input shafts, a first gear pair for transmitting rotation of the first input shaft to the first countershaft, a second gear pair for transmitting rotation of the second input shaft to the second countershaft, and an idle gear provided on the idle shaft and connecting one gear of the first gear pair to one gear of the second gear pair, when establishing a predetermined forward side gear position, the driving force of the engine being transmitted to a driven wheel via the first clutch, the first input shaft, the first gear pair, and the first countershaft, and when establishing a reverse gear position, the driving force of the engine being transmitted to the driven wheel via the second clutch, the second input shaft, one or both gears of the second gear pair, the idle gear, one or both gears of the first gear pair, and the first countershaft.

According to a second aspect of the present invention, in addition to the first aspect, an output shaft is disposed coaxially with the first and second input shafts, and a gear position other than the predetermined forward side gear position and the reverse gear position is established via the output shaft from the first and second countershafts.

An odd-numbered gear clutch Co of an embodiment corresponds to the first clutch of the present invention, an even-numbered gear clutch Ce of the embodiment corresponds to the second clutch of the present invention, a first output shaft 17 of the embodiment corresponds to the output shaft of the present invention, a first input shaft gear 21 and a first countershaft first gear 23 of the embodiment correspond to the first gear pair of the present invention, a second input shaft gear 22 and a second countershaft first gear 28 of the embodiment correspond to the second gear pair of the present invention, and an idle shaft first gear 41 and an idle shaft second gear 42 of the embodiment correspond to the idle gear of the present invention.

According to a third aspect of the present invention, there is provided a transmission comprising a first input shaft and a second input shaft disposed coaxially with each other, a first clutch for transmitting the driving force of an engine to the first input shaft, a second clutch for transmitting the driving force of the engine to the second input shaft, an output shaft disposed in parallel to the first and second input shafts, reversing means for transmitting the driving force by reversing the rotational direction between the first input shaft and the second input shaft, an input gear provided on one of the first and second input shafts, and an output gear provided on the output shaft and always operatively connected to the input gear, when establishing a predetermined forward side gear position, the driving force of the engine being transmitted to a driven wheel via one of the first and second clutches, the input gear provided on one of the first and second input shafts, and the output gear provided on the output shaft, and when establishing a reverse gear position, the driving force of the engine being transmitted to the driven wheel via the other of the first and second clutches, the other of the first and second input shafts, the reversing means, the input gear provided on the one of the first and second input shafts, and the output gear provided on the output shaft.

According to a fourth aspect of the present invention, in addition to the third aspect, an idle shaft and a countershaft are disposed in parallel to the first and second input shafts, the other of the first and second input shafts is always operatively connected to the countershaft via a transmission gear train, an intermediate gear provided on the countershaft is always operatively connected to the output gear, and when establishing a forward side gear position, the driving force of the engine is transmitted to the driven wheel via the other of the first and second clutches, the other of the first and second input shafts, the transmission gear train, the intermediate gear, and the output gear.

An input shaft gear 117, a countershaft gear 118, and an idle gear 119 of the embodiment correspond to the transmission gear train of the present invention, a first speed-third speed-reverse drive gear 120, a fifth speed drive gear 121, a first speed drive gear 151, and a third speed drive gear 152 of the embodiment correspond to the input gear of the present invention, a second speed drive gear 123 and a fourth speed drive gear 124 of the embodiment correspond to the intermediate gear of the present invention, and a first speed-second speed-third speed driven gear 126, a fourth speed-fifth speed driven gear 127, a first speed driven gear 155, and a third speed driven gear 156 of the embodiment correspond to the output gear of the present invention.

Effects of the Invention

In accordance with the first aspect of the present invention, since when establishing the predetermined forward side gear position the engine driving force is transmitted to the driven wheel via the first clutch, the first input shaft, the first gear pair, and the first countershaft, and when establishing the reverse gear position the engine driving force is transmitted to the driven wheel via the second clutch, the second input shaft, one or both gears of the second gear pair, the idle gear, one or both gears of the first gear pair, and the first countershaft, it becomes possible for the predetermined forward side gear position and the reverse gear position to share a relatively long driving force transmission path from one or both gears of the first gear pair to the driven wheel via the first countershaft, thereby reducing effectively the weight and dimensions of the transmission. Moreover if, for example, part of the first speed gear position, which is the lowest gear position on the forward side, is used in common as part of the reverse gear position, it becomes unnecessary to bring in a reduction ratio with the idle gear at the reverse gear position, thereby reducing further effectively the weight and dimensions of the transmission.

Furthermore, in accordance with the second aspect of the present invention, the three shafts, that is, the first and second input shafts and the output shaft, are coaxially disposed, and it is thereby possible to further reduce the dimensions of the transmission by establishing gear positions other than the predetermined forward side gear position and the reverse gear position via the output shaft from the first and second countershafts while reducing the actual number of shafts of the transmission to thus reduce the dimensions.

Moreover, in accordance with the third aspect of the present invention, since when establishing the predetermined forward gear position the engine driving force is transmitted to the driven wheel via one of the first and second clutches, the input gear provided on one of the first and second input shafts, and the output gear provided on the output shaft, and when establishing the reverse gear position the engine driving force is transmitted to the driven wheel via the other one of the first and second clutches, the other one of the first and second input shafts, the reversing means, the input gear provided on the one of the first and second input shafts, and the output gear provided on the output shaft, it becomes possible for the predetermined forward side gear position and the reverse gear position to share a relatively long driving force transmission path from the input gear provided on the one of the first and second input shafts to the driven wheel via the output gear provided on the output shaft, thereby reducing effectively the weight and dimensions of the transmission. Moreover if, for example, part of the first speed gear position, which is the lowest gear position on the forward side, is used in common as part of the reverse gear position, it becomes unnecessary to bring in a reduction ratio with the idle gear at the reverse gear position, thereby reducing further effectively the weight and dimensions of the transmission.

Furthermore, in accordance with the fourth aspect of the present invention, since the idle shaft and the countershaft are disposed in parallel to the first and second input shafts, the other of the first and second input shafts is always operatively connected to the countershaft via the transmission gear train, and the intermediate gear provided on the countershaft is always operatively connected to the output gear, when establishing a forward side gear position the engine driving force can be transmitted to the driven wheel via the other of the first and second clutches, the other of the first and second input shafts, the transmission gear train, the intermediate gear, and the output gear.

BRIEF DESCRIPTION OF DRAWINGS

FIG. 11 is a diagram showing the operational state of an odd-numbered gear clutch and an even-numbered gear clutch, and each synchronizing device at each gear position. (first embodiment)

EXPLANATION OF REFERENCE NUMERALS AND SYMBOLS

Figure 1:
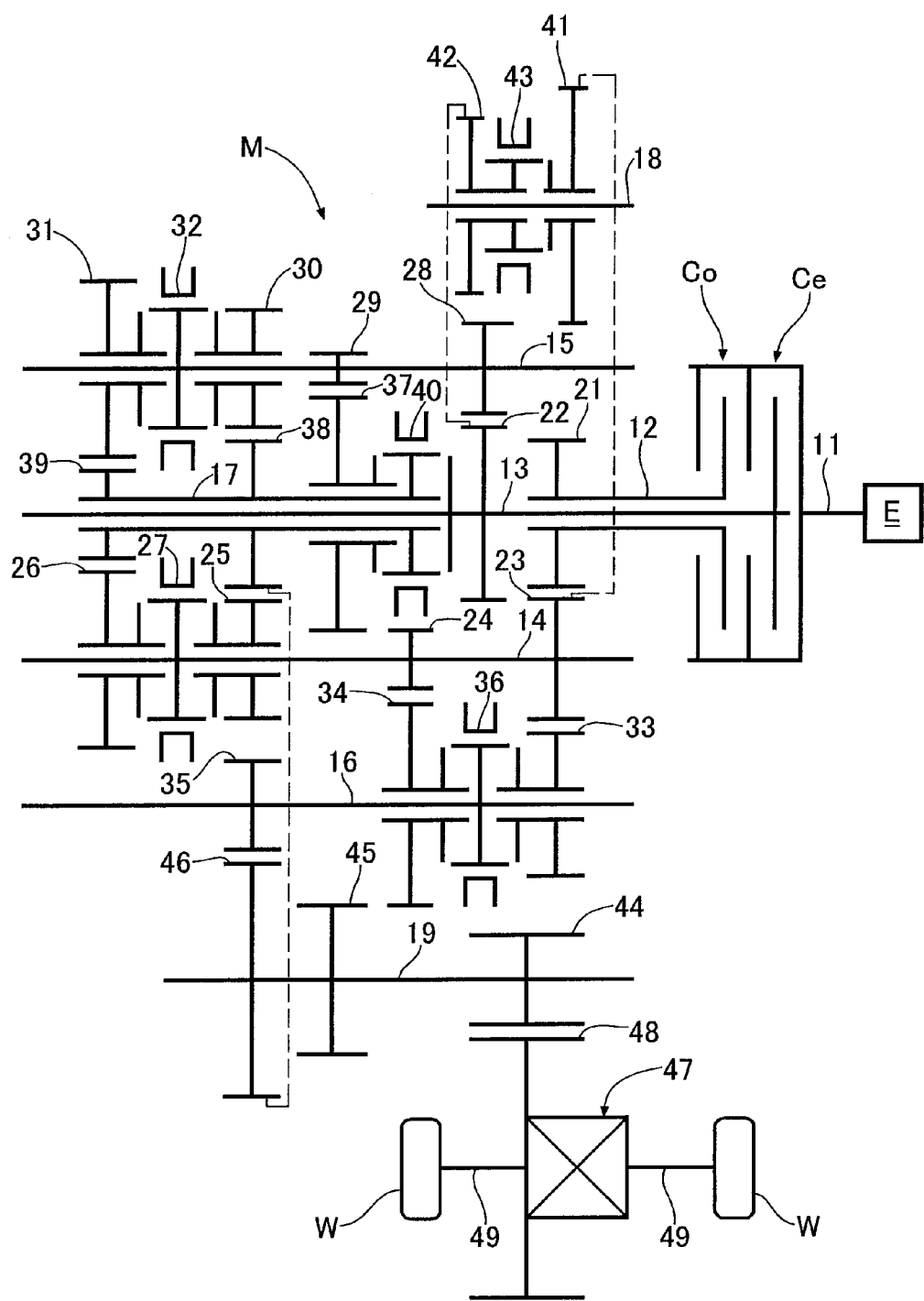
FIG. 1 is a skeleton diagram of a transmission. (first embodiment)

Co Odd-numbered gear clutch (first clutch)
Ce Even-numbered gear clutch (second clutch)
E Engine
W Driven wheel
12 First input shaft
13 Second input shaft
14 First countershaft
15 Second countershaft
17 First output shaft (output shaft)
18 Idle shaft 21 First input shaft gear (first gear pair)
22 Second input shaft gear (second gear pair)
23 First countershaft first gear (first gear pair)
28 Second countershaft first gear (second gear pair)
41 Idle shaft first gear (idle gear)
42 Idle shaft second gear (idle gear)
112 First input shaft
113 Second input shaft
114 Countershaft
115 Output shaft
116 Idle shaft
117 Input shaft gear (transmission gear train)
118 Countershaft gear (transmission gear train)
119 Idle gear (transmission gear train)
120 First speed-third speed-reverse drive gear (input gear)
121 Fifth speed drive gear (input gear)
123 Second speed drive gear (intermediate gear)
124 Fourth speed drive gear (intermediate gear)
126 First speed-second speed-third speed driven gear (output gear)
127 Fourth speed-fifth speed driven gear (output gear)
145 Reversing means
151 First speed drive gear (input gear)
152 Third speed drive gear (input gear)
155 First speed driven gear (output gear)
156 Third speed driven gear (output gear)
164 Reversing means

BEST MODE FOR CARRYING OUT THE INVENTION

Modes for carrying out the present invention are explained below by reference to the attached drawings.

First Embodiment

FIG. 1 to FIG. 9 show a first embodiment of the present invention.

As shown in FIG. 1, an automatic transmission M having eight forward speeds and one reverse speed includes a drive shaft 11 coaxially connected to a crankshaft of an engine E, a sleeve-shaped first input shaft 12 disposed coaxially with the drive shaft 11, a second input shaft 13 coaxially extending through the interior of the first input shaft 12, a first countershaft 14, a second countershaft 15, and a third countershaft 16, which are disposed in parallel to the first input shaft 12, a sleeve-shaped first output shaft 17 coaxially disposed on the outer periphery of the first second input shaft 13, an idle shaft 18 disposed in parallel to the first input shaft 12, and a second output shaft 19 disposed in parallel to the first input shaft 12. An odd-numbered gear clutch Co and an even-numbered gear clutch Ce, which are single plate dry clutches and are disposed in tandem, are connected to the drive shaft 11; when the odd-numbered gear clutch Co is engaged the drive shaft 11 is connected to the first input shaft 12, and when the even-numbered gear clutch Ce is engaged the drive shaft 11 is connected to the second input shaft 13.

A first countershaft first gear 23 and a first countershaft second gear 24 are fixedly provided on the first countershaft 14, and a first countershaft third gear 25 and a first countershaft fourth gear 26 are relatively rotatably supported thereon. The first countershaft third gear 25 and the first countershaft fourth gear 26 can be selectively connected to the first countershaft 14 via a fifth speed-seventh speed synchronizing device 27. The first countershaft first gear 23 meshes with the first input shaft gear 21.

A second countershaft first gear 28 and a second countershaft second gear 29 are fixedly provided on the second countershaft 15, and a second countershaft third gear 30 and a second countershaft fourth gear 31 are relatively rotatably supported thereon. The second countershaft third gear 30 and the second countershaft fourth gear 31 can be selectively connected to the second countershaft 15 via a sixth speed-eighth speed synchronizing device 32. The second countershaft first gear 28 meshes with the second input shaft gear 22.

A third countershaft first gear 33 and a third countershaft second gear 34 are relatively rotatably supported on the third countershaft 16, and a third countershaft third gear 35 is fixedly provided thereon. The third countershaft first gear 33 and the third countershaft second gear 34 can be selectively connected to the third countershaft 16 via a first speed-third speed synchronizing device 36. The third countershaft first gear 33 meshes with the first countershaft first gear 23, and the third countershaft second gear 34 meshes with the first countershaft second gear 24.

A first output shaft first gear 37 is relatively rotatably supported on the first output shaft 17, and a first output shaft second gear 38 and a first output shaft third gear 39 are fixedly provided thereon. A second speed-fourth speed synchronizing device 40 connects the first output shaft first gear 37 to the first output shaft 17 or connects the first output shaft 17 to the second input shaft 13. The first output shaft first gear 37 meshes with the second countershaft second gear 29. The first output shaft second gear 38 meshes with the first countershaft third gear 25 and the second countershaft third gear 30. The first output shaft third gear 39 meshes with the first countershaft fourth gear 26 and the second countershaft fourth gear 31.

An idle shaft first gear 41 and an idle shaft second gear 42 are relatively rotatably supported on the idle shaft 18. The idle shaft first gear 41 and the idle shaft second gear 42 can be connected to each other via a reverse synchronizing device 43. The idle shaft first gear 41 meshes with the first countershaft first gear 23, and the idle shaft second gear 42 meshes with the second input shaft gear 22.

A final drive gear 44, a parking gear 45, and a second output shaft gear 46 are fixedly provided on the second output shaft 19. The second output shaft gear 46 meshes with the third countershaft third gear 35 and the first output shaft second gear 38. The final drive gear 44 meshes with a final driven gear 48 of a differential gear 47. The differential gear 47 is connected to left and right driven wheels W and W via drive shafts 49 and 49.

Since the transmission of the present embodiment is the automatic transmission M, the fifth speed-seventh speed synchronizing device 27, the sixth speed-eighth speed synchronizing device 32, the first speed-third speed synchronizing device 36, the second speed-fourth speed synchronizing device 40, and the reverse synchronizing device 43 are operated by an electronically controlled actuator, which is not illustrated.

Establishment of first speed gear to eighth speed gear positions and a reverse gear position of the automatic transmission M having the above-mentioned arrangement is now explained.

Figure 2:
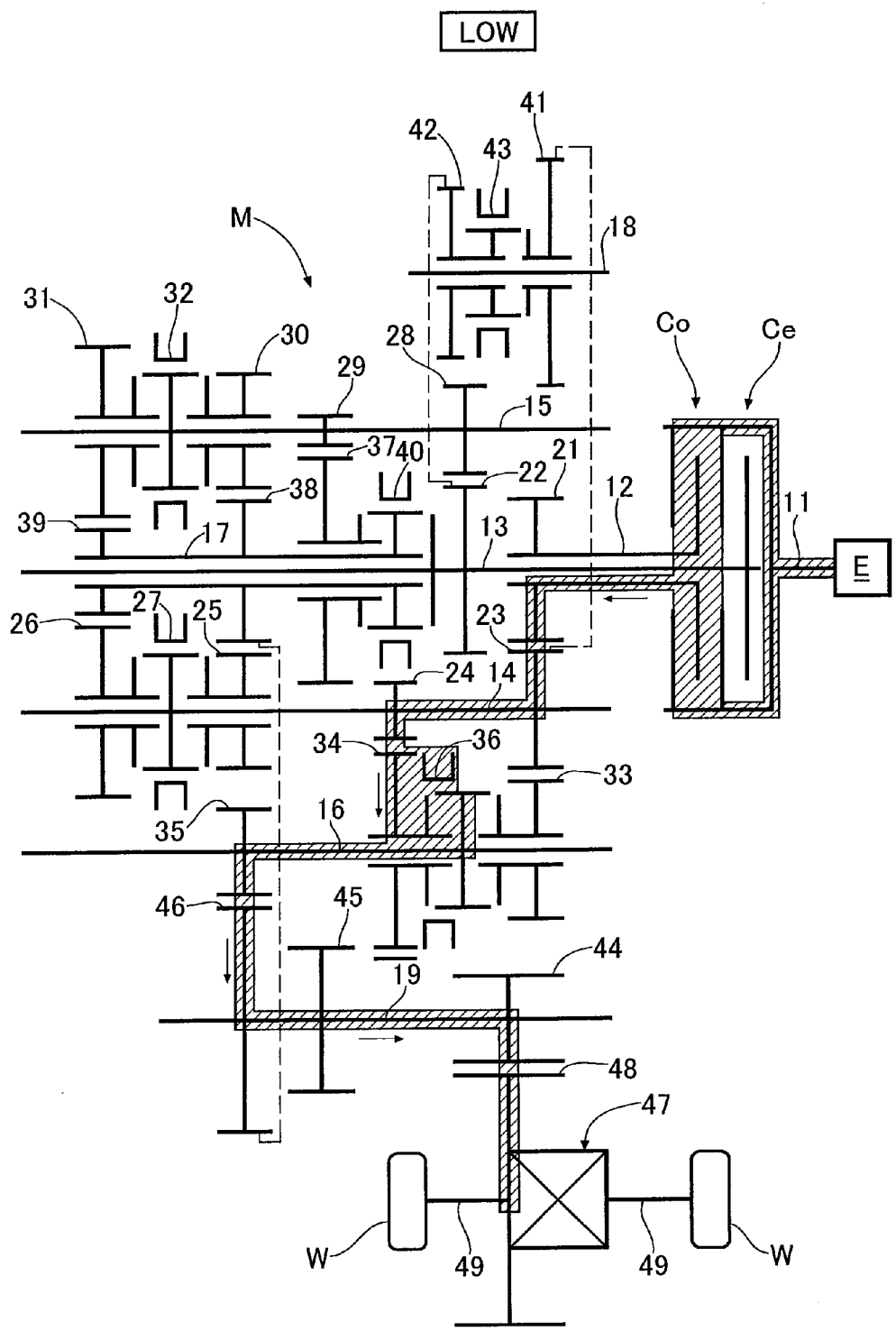
FIG. 2 is a diagram showing a state in which a first speed gear position is established. (first embodiment)

As shown in FIG. 2 and FIG. 11, when establishing the first speed gear position, in a state in which the third countershaft second gear 34 is connected to the third countershaft 16 via the first speed-third speed synchronizing device 36, the odd-numbered gear clutch Co is engaged so as to connect the drive shaft 11 to the first input shaft 12. In this state, the driving force of the engine E is transmitted to the driven wheels W and W via the path: drive shaft 11→odd-numbered gear clutch Co first input shaft 12→first input shaft gear 21→first countershaft first gear 23→first countershaft 14→first countershaft second gear 24→third countershaft second gear 34→first speed-third speed synchronizing device 36→third countershaft 16→third countershaft third gear 35→second output shaft gear 46→second output shaft 19→final drive gear 44→final driven gear 48→differential gear 47→drive shafts 49 and 49.

Figure 3:
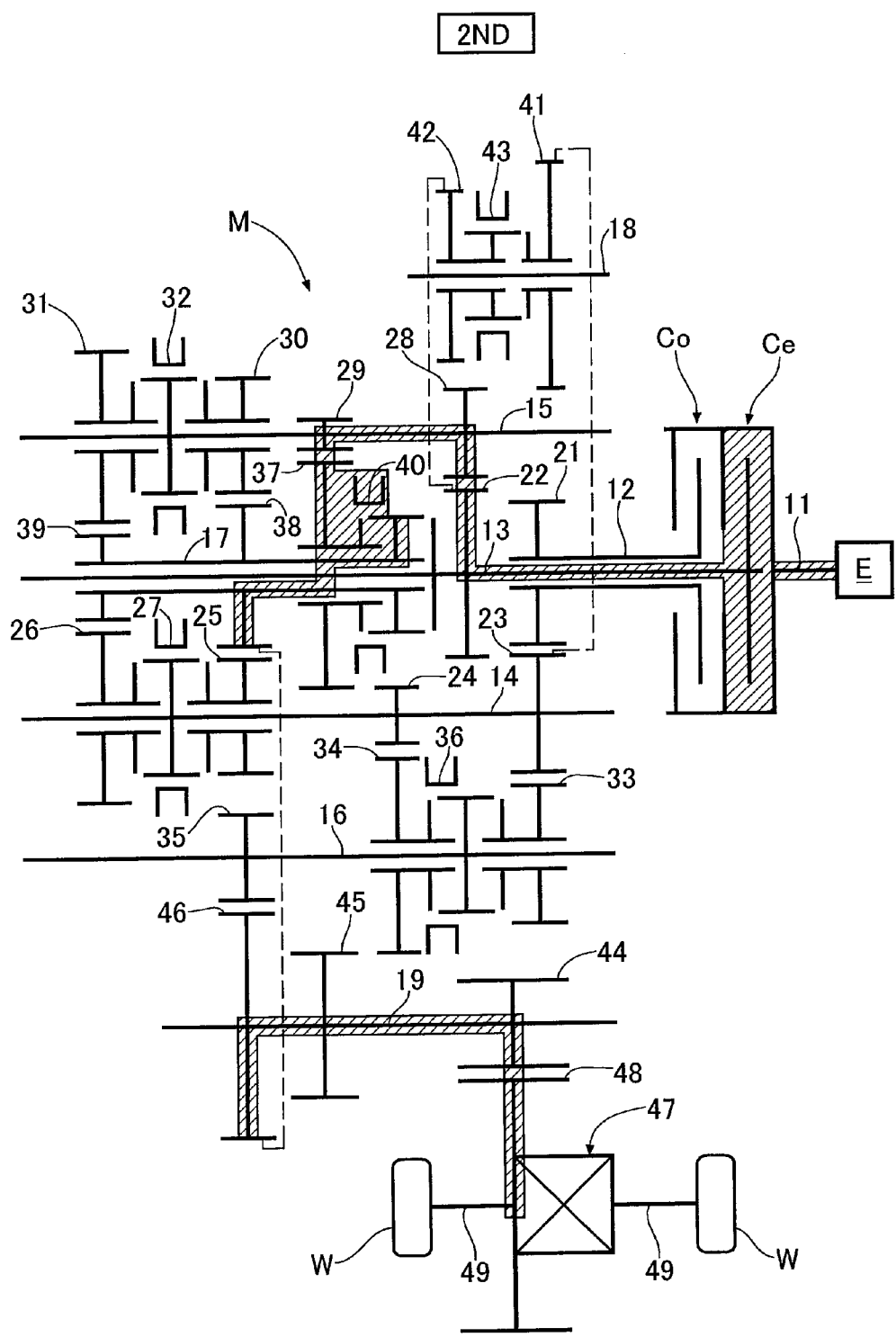
FIG. 3 is a diagram showing a state in which a second speed gear position is established. (first embodiment)

As shown in FIG. 3 and FIG. 11, when establishing the second speed gear position, in a state in which the first output shaft first gear 37 is connected to the first output shaft 17 via the second speed-fourth speed synchronizing device 40, the even-numbered gear clutch Ce is engaged so as to connect the drive shaft 11 to the second input shaft 13. In this state, the driving force of the engine E is transmitted to the driven wheels W and W via the path: drive shaft 11→even-numbered gear clutch Ce→second input shaft 13→second input shaft gear 22→second countershaft first gear 28→second countershaft 15→second countershaft second gear 29→first output shaft first gear 37→second speed-fourth speed synchronizing device 40→first output shaft 17→first output shaft second gear 38→second output shaft gear 46→second output shaft 19→final drive gear 44→final driven gear 48→differential gear 47→drive shafts 49 and 49.

Figure 4:
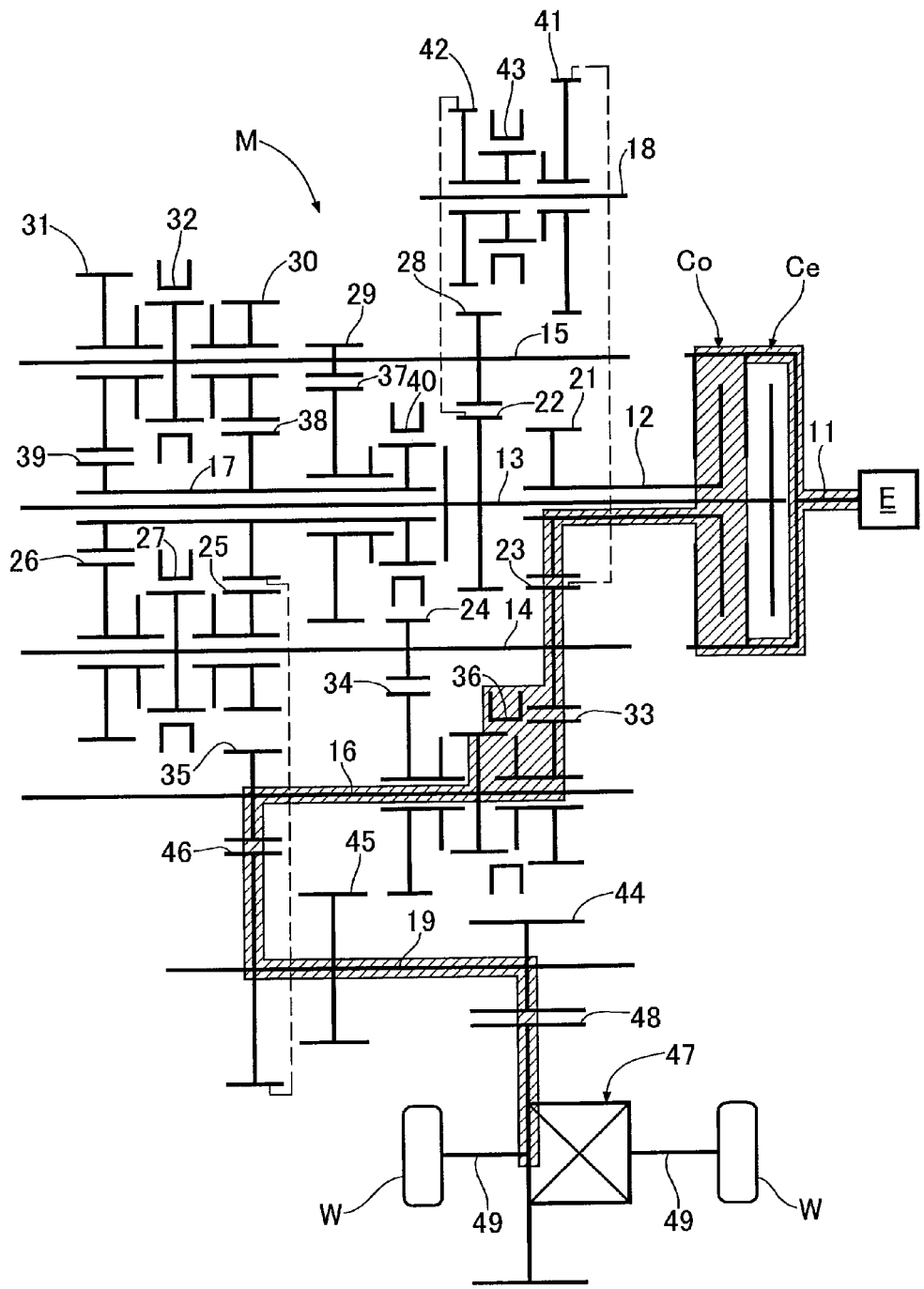
FIG. 4 is a diagram showing a state in which a third speed gear position is established. (first embodiment)

As shown in FIG. 4 and FIG. 11, when establishing the third speed gear position, in a state in which the third countershaft first gear 33 is connected to the third countershaft 16 via the first speed-third speed synchronizing device 36, the odd-numbered gear clutch Co is engaged so as to connect the drive shaft 11 to the first input shaft 12. In this state, the driving force of the engine E is transmitted to the driven wheels W and W via the path: drive shaft 11→odd-numbered gear clutch Co→first input shaft 12→first input shaft gear 21→first countershaft first gear 23→third countershaft first gear 33→first speed-third speed synchronizing device 36→third countershaft 16→third countershaft third gear 35→second output shaft gear 46→second output shaft 19→final drive gear 44→final driven gear 48→differential gear 47→drive shafts 49 and 49.

Figure 5:
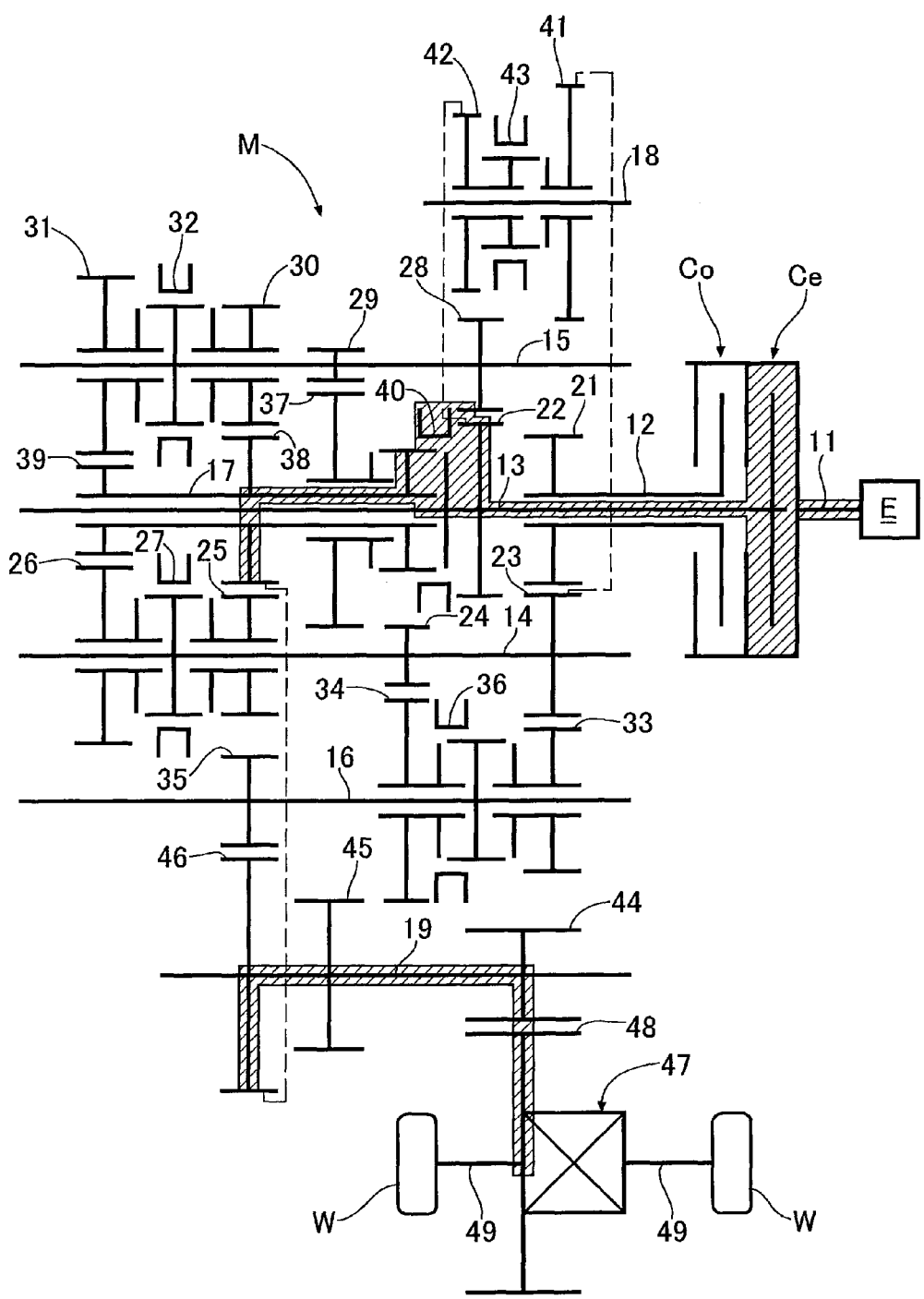
FIG. 5 is a diagram showing a state in which a fourth speed gear position is established. (first embodiment)

As shown in FIG. 5 and FIG. 11, when establishing the fourth speed gear position, in a state in which the second input shaft 13 is connected to the first output shaft 17 via the second speed-fourth speed synchronizing device 40, the even-numbered gear clutch Ce is engaged so as to connect the drive shaft 11 to the second input shaft 13. In this state, the driving force of the engine E is transmitted to the driven wheels W and W via the path: drive shaft 11→even-numbered gear clutch Ce→second input shaft 13→second speed-fourth speed synchronizing device 40→first output shaft 17→first output shaft second gear 38→second output shaft gear 46→second output shaft 19→final drive gear 44→final driven gear 48→differential gear 47→drive shafts 49 and 49.

Figure 6:
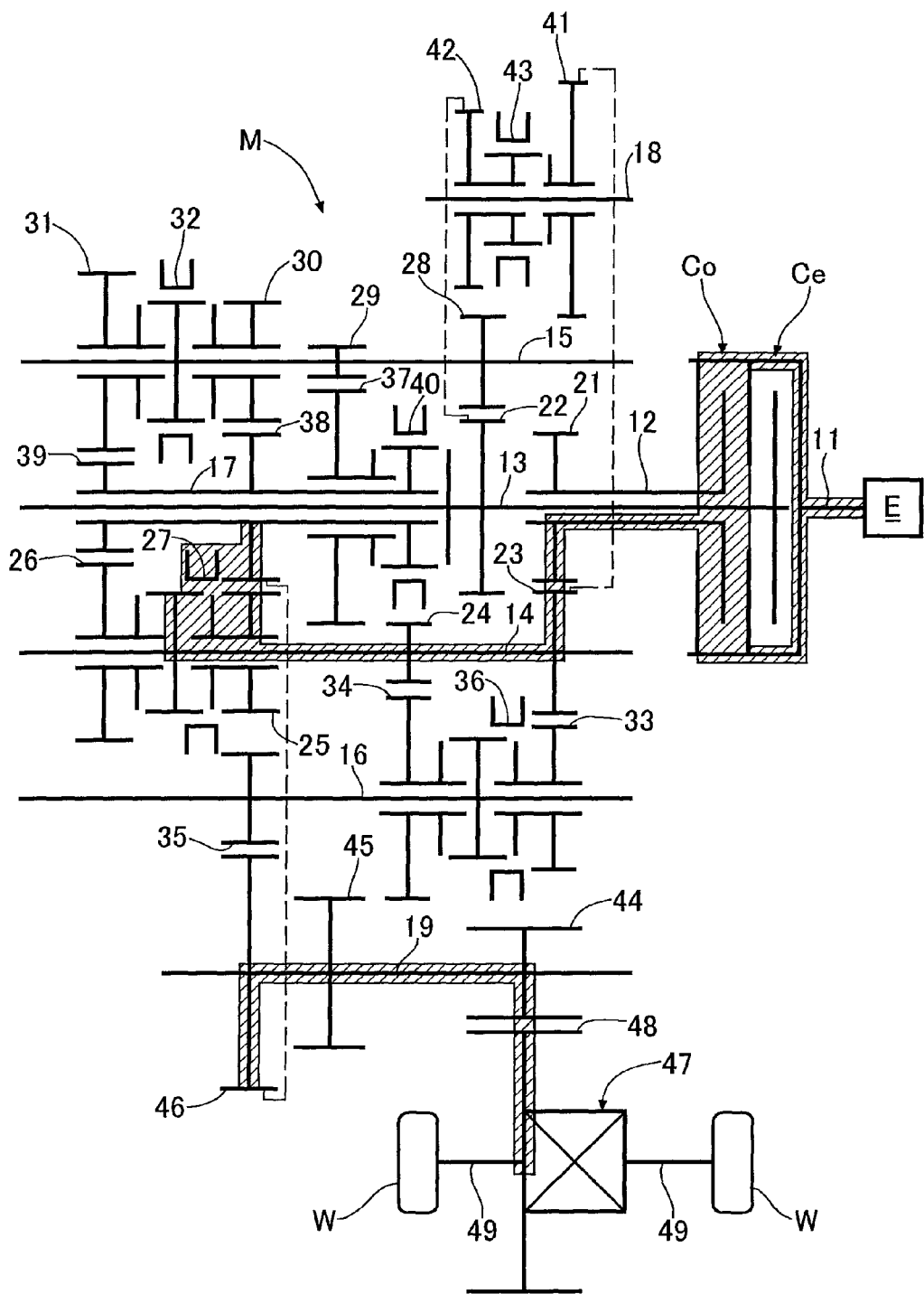
FIG. 6 is a diagram showing a state in which a fifth speed gear position is established. (first embodiment)

As shown in FIG. 6 and FIG. 11, when establishing the fifth speed gear position, in a state in which the first countershaft third gear 25 is connected to the first countershaft 14 via the fifth speed-seventh speed synchronizing device 27, the odd-numbered gear clutch Co is engaged so as to connect the drive shaft 11 to the first input shaft 12. In this state, the driving force of the engine E is transmitted to the driven wheels W and W via the path: drive shaft 11→odd-numbered gear clutch Co→first input shaft 12→first input shaft gear 21→first countershaft first gear 23→first countershaft 14→fifth speed-seventh speed synchronizing device 27→first countershaft third gear 25→first output shaft second gear 38→second output shaft gear 46→second output shaft 19→final drive gear 44→final driven gear 48→differential gear 47→drive shafts 49 and 49.

Figure 7:
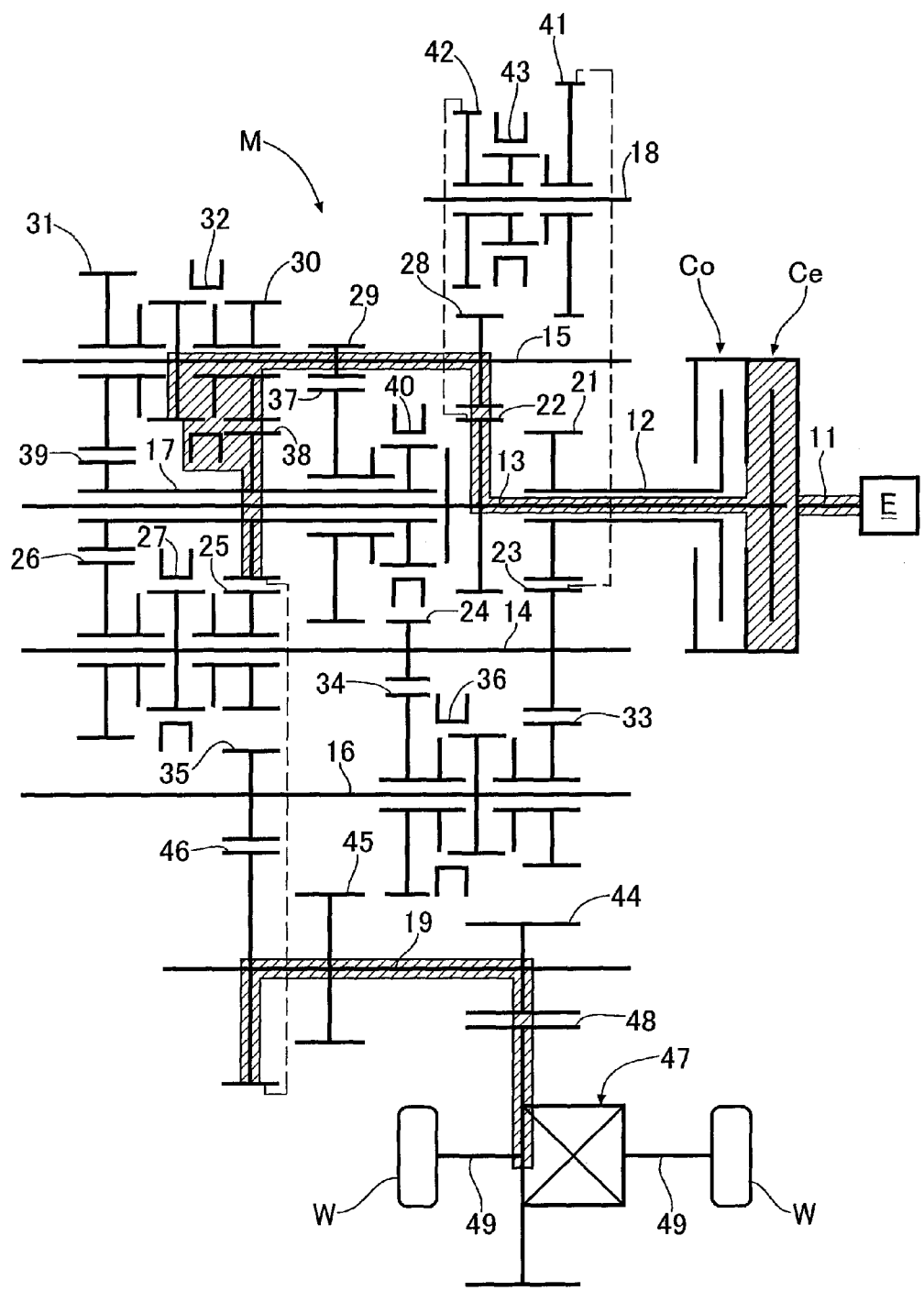
FIG. 7 is a diagram showing a state in which a sixth speed gear position is established. (first embodiment)

As shown in FIG. 7 and FIG. 11, when establishing the sixth speed gear position, in a state in which the second countershaft third gear 30 is connected to the second countershaft 15 via the sixth speed-eighth speed synchronizing device 32, the even-numbered gear clutch Ce is engaged so as to connect the drive shaft 11 to the second input shaft 13. In this state, the driving force of the engine E is transmitted to the driven wheels W and W via the path: drive shaft 11→even-numbered gear clutch Ce→second input shaft 13→second input shaft gear 22→second countershaft first gear 28→second countershaft 15→sixth speed-eighth speed synchronizing device 32→second countershaft third gear 30→first output shaft second gear 38→second output shaft gear 46→second output shaft 19→final drive gear 44→final driven gear 48→differential gear 47→drive shafts 49 and 49.

Figure 8:
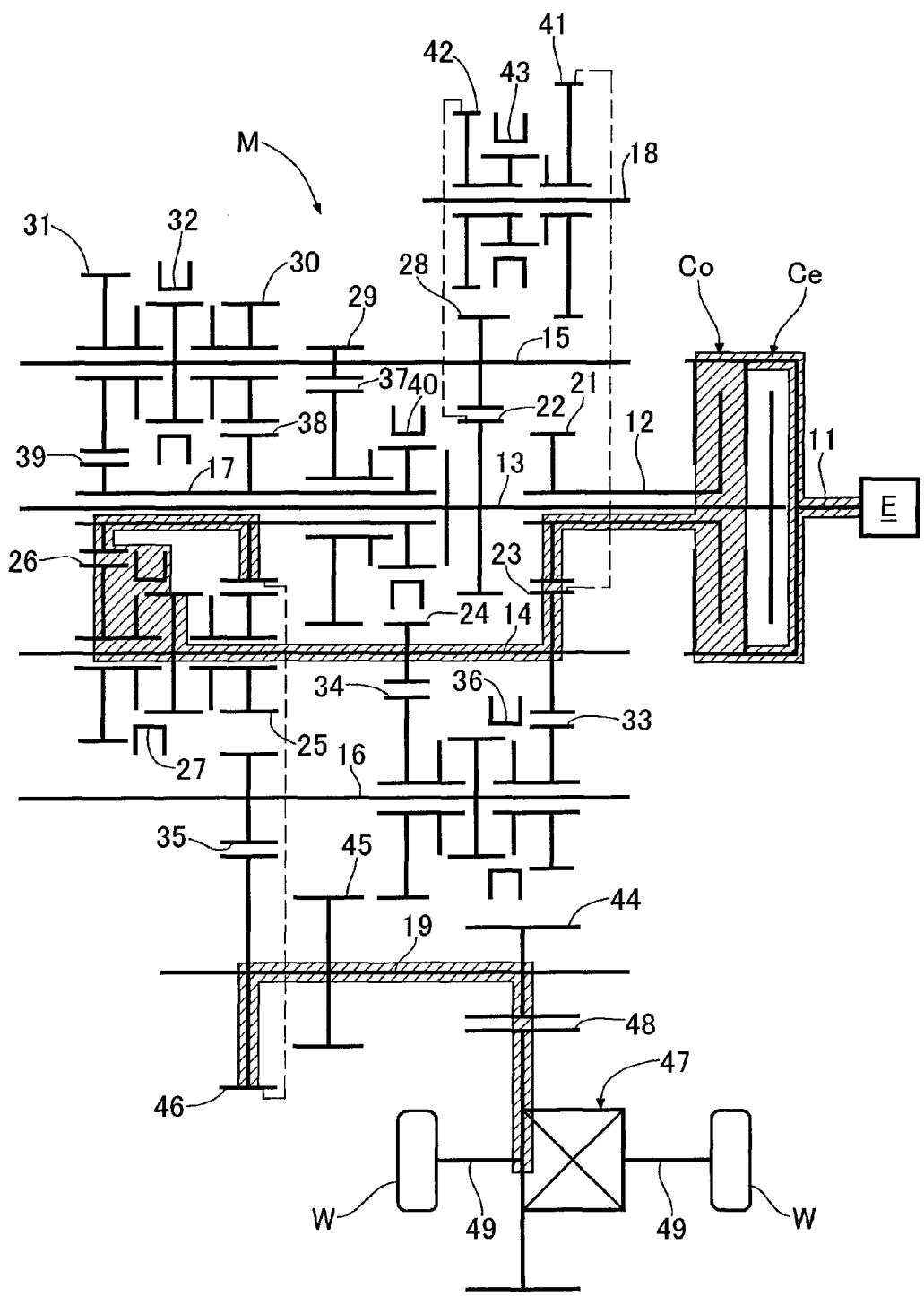
FIG. 8 is a diagram showing a state in which a seventh speed gear position is established. (first embodiment)

As shown in FIG. 8 and FIG. 11, when establishing the seventh speed gear position, in a state in which the first countershaft fourth gear 26 is connected to the first countershaft 14 via the fifth speed-seventh speed synchronizing device 27, the odd-numbered gear clutch Co is engaged so as to connect the drive shaft 11 to the first input shaft 12. In this state, the driving force of the engine E is transmitted to the driven wheels W and W via the path: drive shaft 11→odd-numbered gear clutch Co→first input shaft 12→first input shaft gear 21→first countershaft first gear 23→first countershaft 14→fifth speed-seventh speed synchronizing device 27→first countershaft fourth gear 26→first output shaft third gear 39→first output shaft 17→first output shall second gear 38→second output shaft gear 46→second output shaft 19→final drive gear 44→final driven gear 48→differential gear 47→drive shafts 49 and 49.

Figure 9:
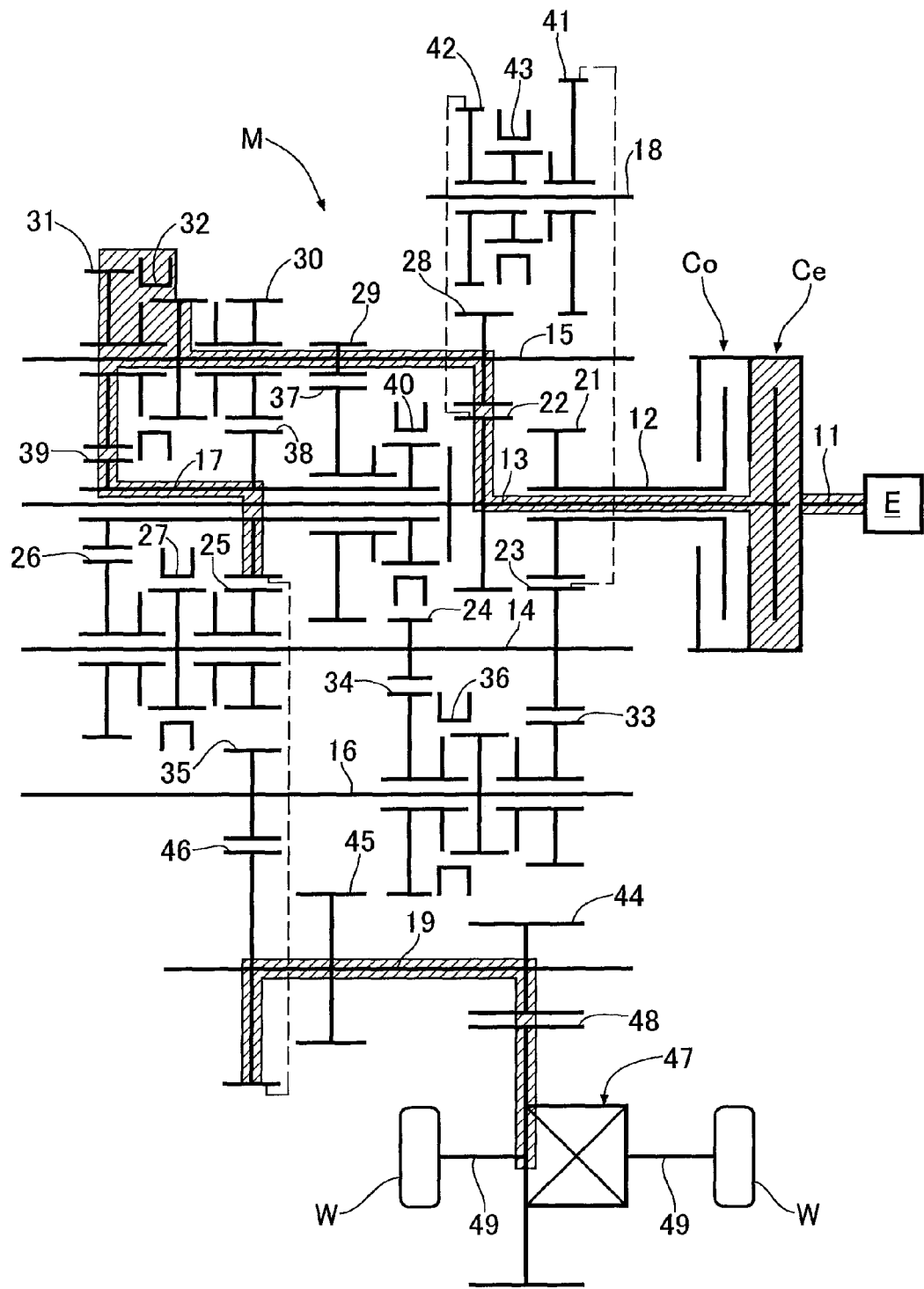
FIG. 9 is a diagram showing a state in which an eighth speed gear position is established. (first embodiment)

As shown in FIG. 9 and FIG. 11, when establishing the eighth speed gear position, in a state in which the second countershaft fourth gear 31 is connected to the second countershaft 15 via the sixth speed-eighth speed synchronizing device 32, the even-numbered gear clutch Ce is engaged so as to connect the drive shaft 11 to the second input shaft 13. In this state, the driving force of the engine E is transmitted to the driven wheels W and W via the path: drive shaft 11→even-numbered gear clutch Ce→second input shaft 13→second input shaft gear 22→second countershaft first gear 28→second countershaft 15→sixth speed-eighth speed synchronizing device 32→second countershaft fourth gear 31→first output shaft third gear 39→first output shaft 17→first output shaft second gear 38→second output shaft gear 46→second output shaft 19→final drive gear 44→final driven gear 48→differential gear 47→drive shafts 49 and 49.

Figure 10:
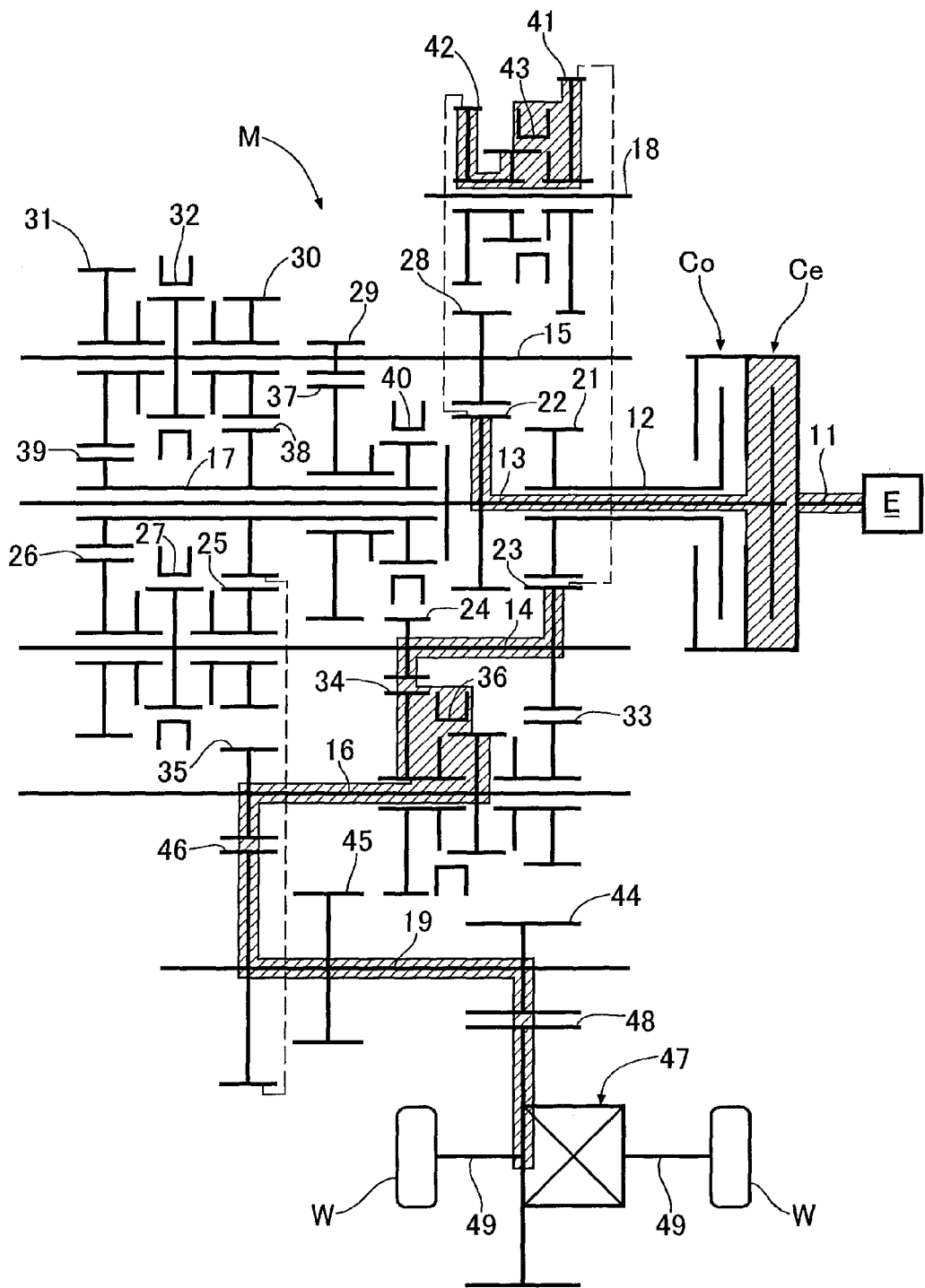
FIG. 10 is a diagram showing a state in which a reverse gear position is established. (first embodiment)

As shown in FIG. 10 and FIG. 11, when establishing the reverse gear position, in a state in which the idle shaft first gear 41 is connected to the idle shaft second gear 42 via the reverse synchronizing device 43 and the third countershaft second gear 34 is connected to the third countershaft 16 via the first speed-third speed synchronizing device 36, the even-numbered gear clutch Ce is engaged so as to connect the drive shaft 11 to the second input shaft 13. In this state, the driving force of the engine E is reversed and transmitted to the driven wheels W and W via the path: drive shaft 11→even-numbered gear clutch Ce→second input shaft 13→second input shaft gear 22→idle shaft second gear 42→reverse synchronizing device 43→idle shaft first gear 41→first countershaft first gear 23→first countershaft 14→first countershaft second gear 24→third countershaft second gear 34→first speed-third speed synchronizing device 36→third countershaft 16→third countershaft third gear 35→second output shaft gear 46→second output shaft 19→final drive gear 44→final driven gear 48→differential gear 47→drive shafts 49 and 49.

As hereinbefore described, as is clear from a comparison of when the first speed gear position is established in FIG. 2 and when the reverse gear position is established in FIG. 10, since the two gear positions share a long driving force transmission path, that is, first countershaft first gear 23→first countershaft 14→first countershaft second gear 24→third countershaft second gear 34→first speed-third speed synchronizing device 36→third countershaft 16→third countershaft third gear 35→second output shaft gear 46→second output shaft 19→final drive gear 44→final driven gear 48→differential gear 47→drive shafts 49 and 49→driven wheels W and W, the weight and dimensions of the transmission M can be reduced effectively. Since the shared driving force transmission path contains the majority of the driving force transmission path for the first speed gear position, it becomes unnecessary to bring in a reduction ratio with the idle shaft first gear 41 and the idle shaft second gear 42 for the reverse gear position, and the weight and dimensions of the transmission M can be reduced more effectively.

Furthermore, the three shafts, that is, the first input shaft 12, the second input shaft 13, and the first output shaft 17, are coaxially disposed, and it is thereby possible, while reducing the actual number of shafts of the transmission M to thus reduce the dimensions, to further reduce the dimensions of the transmission M by establishing the gear positions other than the first speed gear position and the reverse gear position (excluding the third speed gear position) via the first output shaft 17 from the first countershaft 14 or the second countershaft 15.

Second Embodiment

Figure 12:
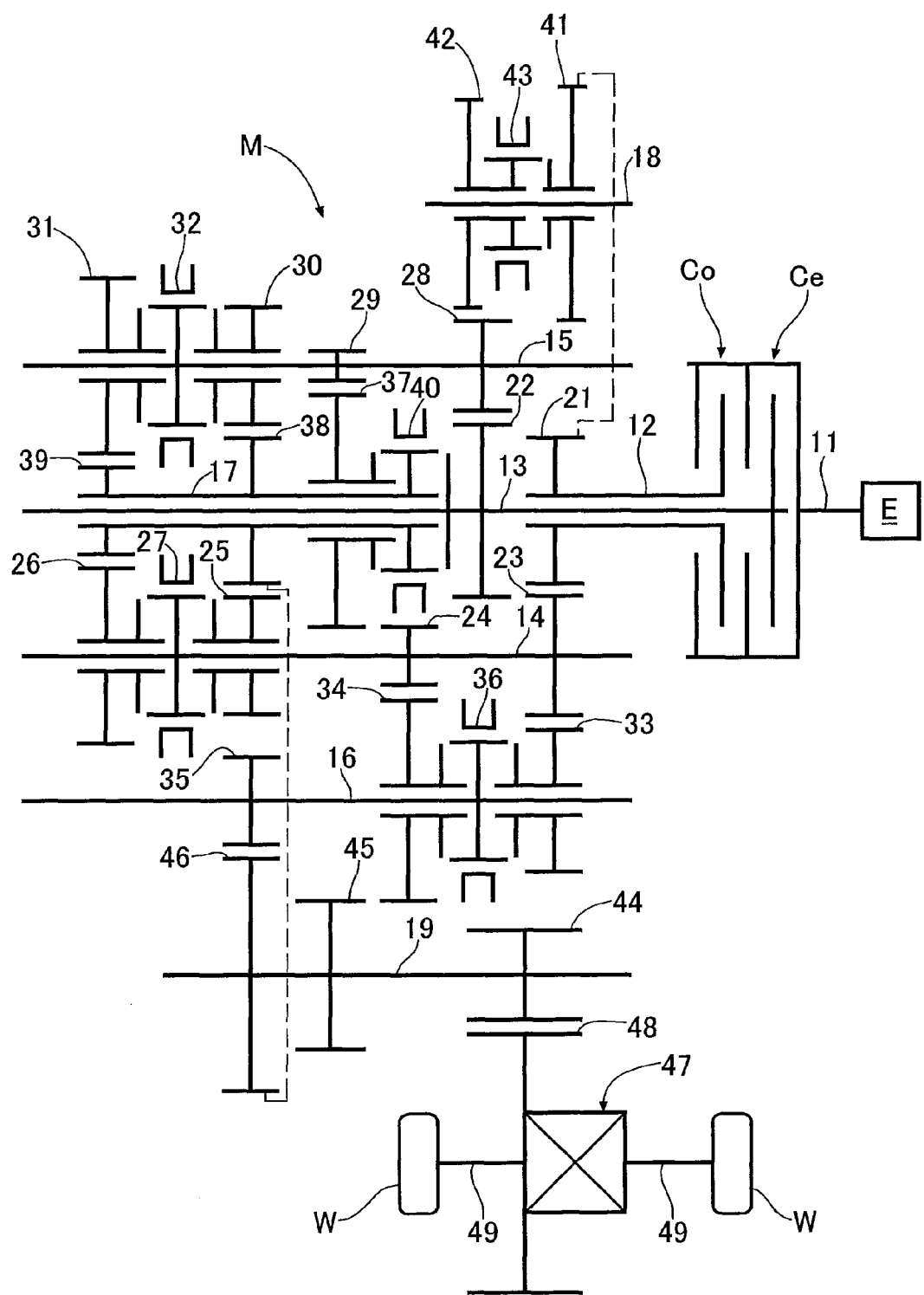
FIG. 12 is a skeleton diagram of a transmission. (second embodiment)

A second embodiment of the present invention is now explained by reference to FIG. 12.

In the first embodiment, the idle shaft first gear 41 always meshes with the first countershaft first gear 23 fixedly provided on the first countershaft 14, and the idle shall second gear 42 meshes with the second input shaft gear 22 fixedly provided on the second input shaft 13, but while taking into consideration that the first countershaft first gear 23 fixedly provided on the first countershaft 14 always meshes with the first input shaft gear 21 fixedly provided on the first input shaft 12 and the second input shaft gear 22 fixedly provided on the second input shaft 13 always meshes with the second countershaft first gear 28 fixedly provided on the second countershaft 15, in the second embodiment an idle shaft first gear 41 is made to always mesh with a first input shaft gear 21 fixedly provided on a first input shaft 12, and an idle shaft second gear 42 is made to always mesh with a second countershaft first gear 28 fixedly provided on a second countershaft 15.

In accordance with this second embodiment, first speed gear to eighth speed gear positions and a reverse gear position can be established based on the operation diagram shown in FIG. 11. The first input shaft gear 21 can be included in the gears that are shared when establishing the first speed gear position and when establishing the reverse gear position, and a driving force transmission path that is shared when establishing the two gear positions can be guaranteed to be longer than for the first embodiment by a portion corresponding to the first input shaft gear 21.

Third Embodiment

A third embodiment of the present invention is now explained by reference to FIG. 13 to FIG. 15.

Figure 13:
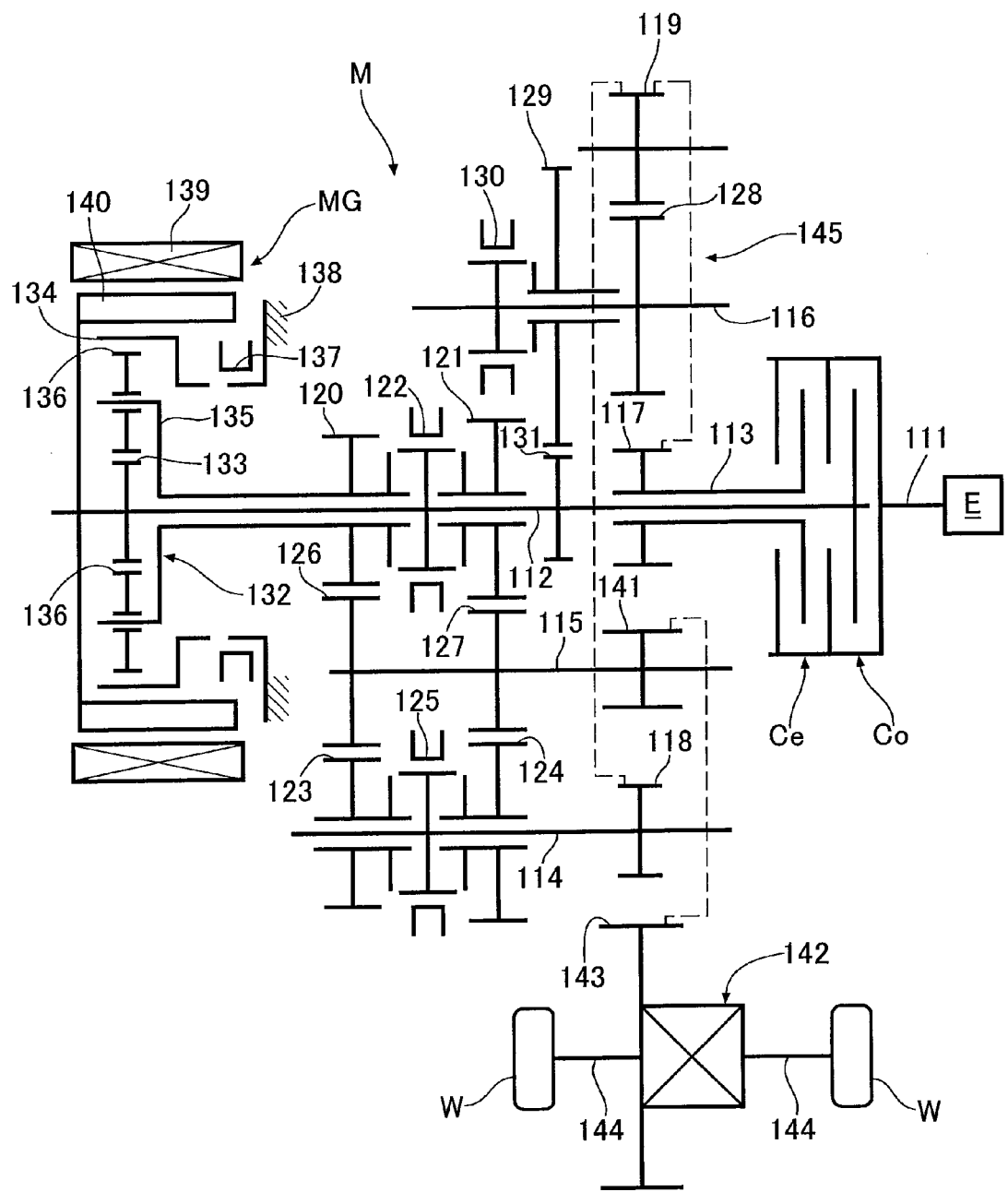
FIG. 13 is a skeleton diagram of a transmission. (third embodiment)

As shown in FIG. 13, an automatic transmission M having five forward speeds and one reverse speed includes a drive shaft 111 coaxially connected to a crankshaft of an engine E, a first input shaft 112 disposed coaxially with the drive shaft 111, a sleeve-shaped second input shaft 113 surrounding the outer periphery of the first input shaft 112, and a countershaft 114, an output shaft 115, and an idle shaft 116 disposed in parallel to the first and second input shafts 112 and 113. An odd-numbered gear clutch Co and an even-numbered gear clutch Ce, which are single plate dry clutches and are disposed in tandem, are connected to the drive shaft 111; when the odd-numbered gear clutch Co is engaged the drive shaft 111 is connected to the first input shaft 112, and when the even-numbered gear clutch Ce is engaged the drive shaft 111 is connected to the second input shaft 113.

An input shaft gear 117 is fixedly provided on the second input shaft 113, a countershaft gear 118 is fixedly provided on the countershaft 114, and the input shaft gear 117 and the countershaft gear 118 are always connected via an idle gear 119.

A first speed-third speed-reverse drive gear 120 and a fifth speed drive gear 121 are relatively rotatably supported on the first input shaft 112, and the first speed-third speed-reverse drive gear 120 and the fifth speed drive gear 121 can be selectively connected to the first input shaft 112 via a third speed-fifth speed synchronizing device 122. A second speed drive gear 123 and a fourth speed drive gear 124 are relatively rotatably supported on the countershaft 114, and the second speed drive gear 123 and the fourth speed drive gear 124 can be selectively connected to the countershaft 114 via a second speed-fourth speed synchronizing device 125.

A first speed-second speed-third speed driven gear 126 and a fourth speed-fifth speed driven gear 127 are fixedly provided on the output shaft 115, the first speed-second speed-third speed driven gear 126 meshes with the first speed-third speed-reverse drive gear 120 and the second speed drive gear 123, and the fourth speed-fifth speed driven gear 127 meshes with the fourth speed drive gear 124 and the fifth speed drive gear 121.

A reverse drive gear 128 is fixedly provided on the idle shaft 116, a reverse idle gear 129 is relatively rotatably supported thereon, and the reverse idle gear 129 can be connected to the idle shaft 116 via a reverse dog clutch 130. The reverse idle gear 129 meshes with a reverse driven gear 131 fixedly provided on the first input shaft 112.

A planetary gear mechanism 132 provided at the shaft end of the first input shaft 112 includes a sun gear 133, a ring gear 134, a carrier 135, and a plurality of pinions 136; the sun gear 133 is connected to the first input shaft 112, the carrier 135 is connected to the first speed-third speed-reverse drive gear 120, and the ring gear 134 can be connected to a housing 138 via a first speed dog clutch 137.

Furthermore, the automatic transmission M is provided with a motor/generator MG equipped with a stator 139 and a rotor 140, and the rotor 140 is connected to the first input shaft 112.

A final drive gear 141 fixedly provided on the output shaft 115 meshes with a final driven gear 143 of a differential gear 142. The differential gear 142 is connected to left and right driven wheels W and W via drive shafts 144 and 144.

The input shaft gear 117, the idle gear 119, the reverse drive gear 128, the idle shaft 116, the reverse dog clutch 130, the reverse idle gear 129, and the reverse driven gear 131 form reversing means 145 for reversing the rotation of the second input shaft 113 and transmitting it to the first input shaft 112.

Establishment of first speed gear to fifth speed gear positions and a reverse gear position of the automatic transmission M having the above-mentioned arrangement is now explained.

Figure 14:
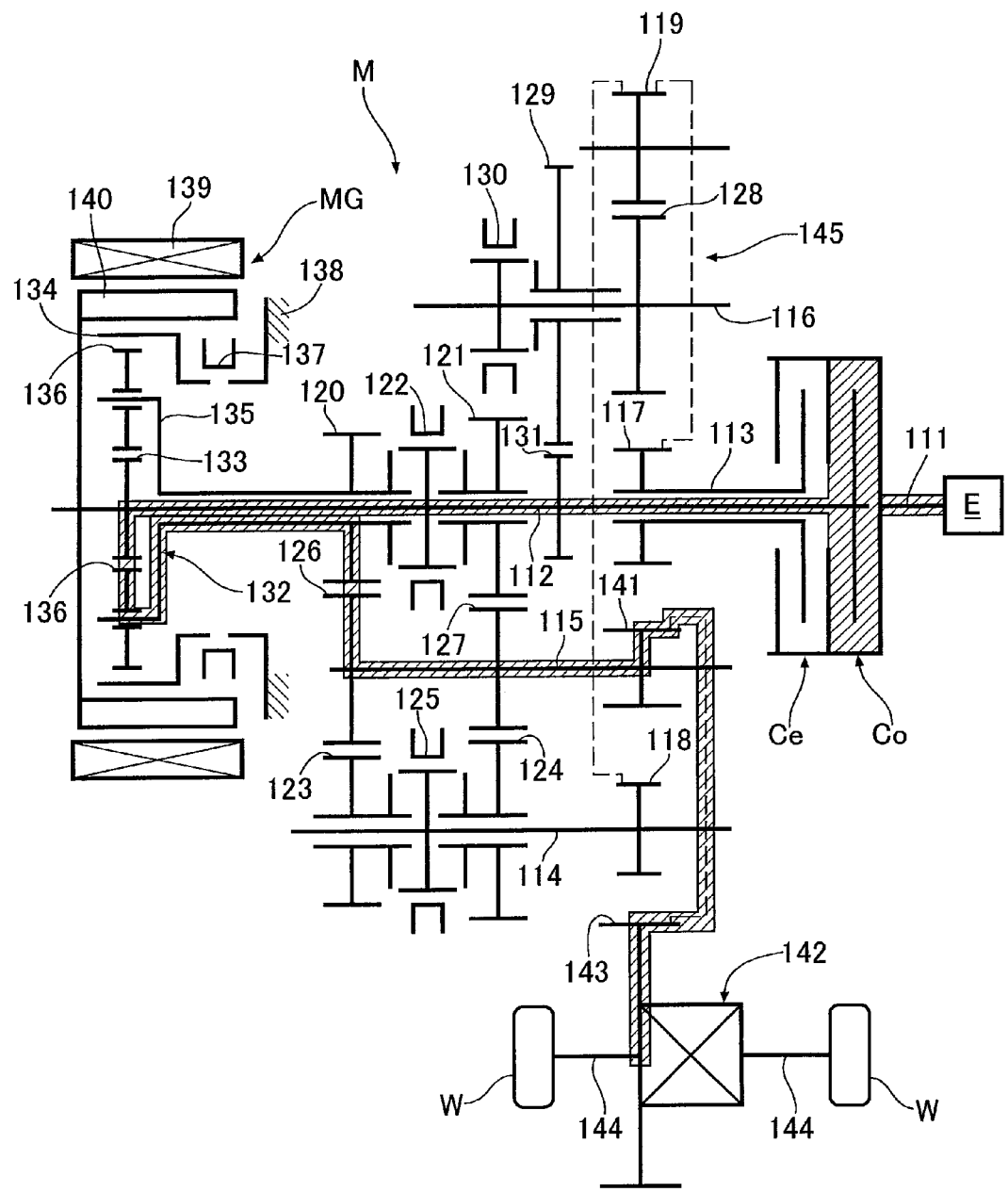
FIG. 14 is a diagram showing a state in which a first speed gear position is established. (third embodiment)

As shown in FIG. 14, when establishing the first speed gear position, in a state in which the ring gear 134 of the planetary gear mechanism 132 is connected to the housing 138 via the first speed dog clutch 137, the odd-numbered gear clutch Co is engaged so as to connect the drive shaft 111 to the first input shaft 112. In this state, the driving force of the engine E is transmitted to the driven wheels W and W via the path: drive shaft 111→odd-numbered gear clutch Co→first input shaft 112→sun gear 133→pinion 136→carrier 135→first speed-third speed-reverse drive gear 120→first speed-second speed-third speed driven gear 126→output shaft 115→final drive gear 141→final driven gear 143→differential gear 142→drive shafts 144 and 144.

When establishing the third speed gear position or the fifth speed gear position, in a state in which the first speed-third speed-reverse drive gear 120 or the fifth speed drive gear 121 is connected to the first input shaft 112 via the third speed-fifth speed synchronizing device 122, the odd-numbered gear clutch Co may be engaged so as to connect the drive shaft 111 to the first input shaft 112.

The second input shaft 113 is always connected to the countershaft 114 via the input shaft gear 117, the idle gear 119, and the countershaft gear 118. Therefore, when establishing the second speed gear position or the fourth speed gear position, in a state in which the second drive gear 123 or the fourth speed drive gear 124 is connected to the countershaft 114 via the second speed-fourth speed synchronizing device 125, the even-numbered gear clutch Ce may be engaged so as to connect the drive shaft 111 to the second input shaft 113.

Figure 15:
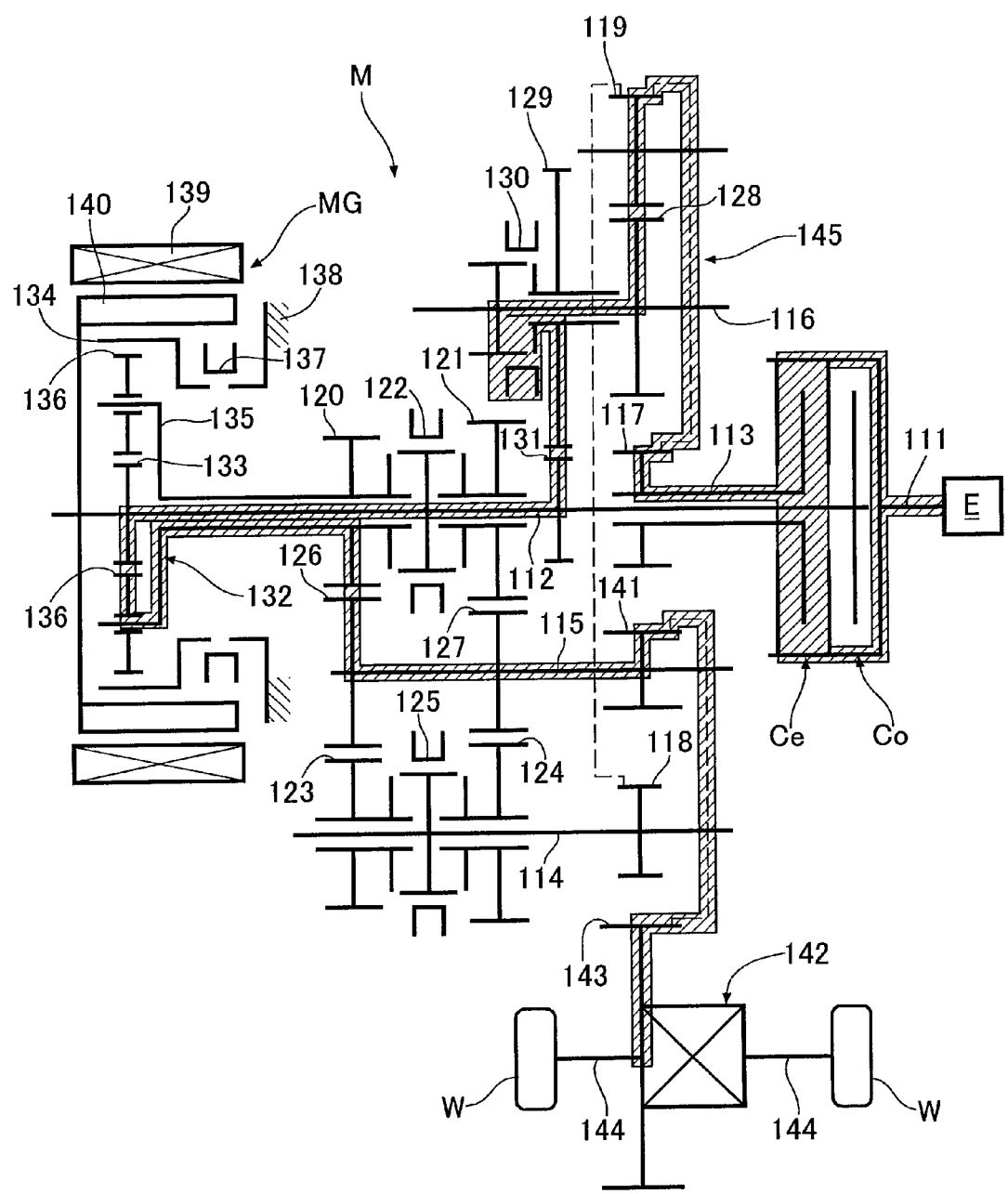
FIG. 15 is a diagram showing a state in which a reverse gear position is established. (third embodiment)

As shown in FIG. 15, when establishing the reverse gear position, in a state in which the reverse idle gear 129 is connected to the idle shaft 116 via the reverse dog clutch 130 and the ring gear 134 of the planetary gear mechanism 132 is connected to the housing 138 via the first speed dog clutch 137, the even-numbered gear clutch Ce is engaged so as to connect the drive shaft 111 to the second input shaft 113. In this state, the driving force of the engine E is reversed and transmitted to the driven wheels W and W via the path: drive shaft 111→even-numbered gear clutch Ce→second input shaft 113→reversing means 145→first input shaft 112→sun gear 133→pinion 136→carrier 135→first speed-third speed-reverse drive gear 120→first speed-second speed-third speed driven gear 126→output shaft 115→final drive gear 141→final driven gear 143→differential gear 142→drive shafts 144 and 144.

When the driving force is transmitted to the driven wheels W and W via the first input shaft 112, that is, when establishing the first speed gear position, the third speed gear position, the fifth speed gear position, and the reverse gear position, the driving force of the engine E may be assisted by driving the motor/generator MG, and kinetic energy of a vehicle body may be recovered as electric energy by regeneratively braking the motor/generator MG.

As hereinbefore described, as is clear from a comparison of when the first speed gear position is established in FIG. 14 and when the reverse gear position is established in FIG. 15, since the two gear positions share a long driving force transmission path, that is, first input shaft 112→sun gear 133→pinion 136→carrier 135→first speed-third speed-reverse drive gear 120→first speed-second speed-third speed driven gear 126→output shaft 115→final drive gear 141→final driven gear 143→differential gear 142→drive shafts 144 and 144→driven wheels W and W, the weight and dimensions of the transmission M can be reduced effectively. Since the shared driving force transmission path contains the majority of the driving force transmission path for the first speed gear position, it becomes unnecessary to specially bring in a reduction ratio with the reverse gear position, and the weight and dimensions of the transmission M can be reduced more effectively.

Fourth Embodiment

A fourth embodiment of the present invention is now explained by reference to FIG. 16 to FIG. 18.

Figure 16:
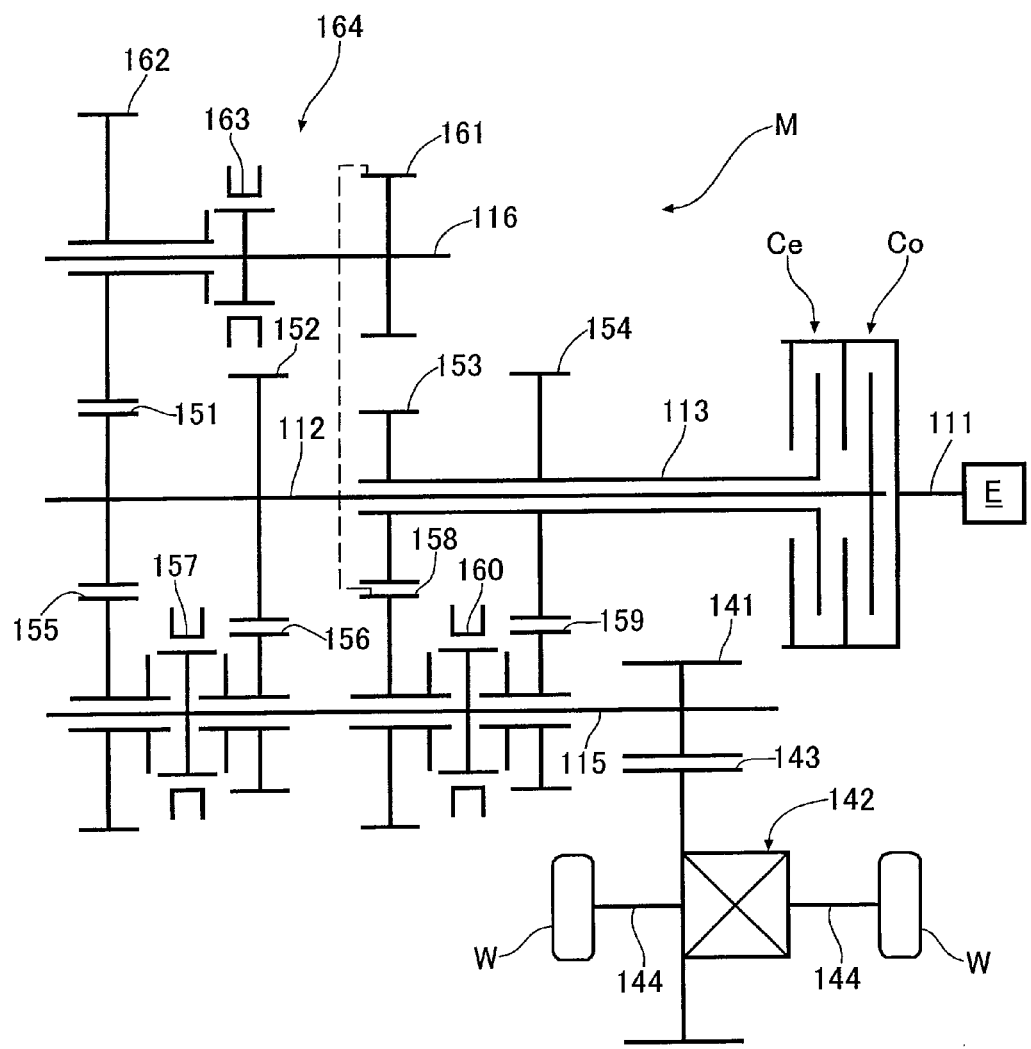
FIG. 16 is a skeleton diagram of a transmission. (fourth embodiment)

As shown in FIG. 16, an automatic transmission M having four forward speeds and one reverse speed includes a drive shaft 111 connected to a crankshaft of an engine E, a first input shaft 112 disposed coaxially with the drive shaft 111, a sleeve-shaped second input shaft 113 surrounding the outer periphery of the first input shaft 112, and an output shaft 115 and an idle shaft 116 disposed in parallel to the first and second input shafts 112 and 113. An odd-numbered gear clutch Co and an even-numbered gear clutch Ce, which are single plate dry clutches and are disposed in tandem, are connected to the drive shaft 111; when the odd-numbered gear clutch Co is engaged the drive shaft 111 is connected to the first input shaft 112, and when the even-numbered gear clutch Ce is engaged the drive shaft 111 is connected to the second input shaft 113.

A first speed drive gear 151 and a third speed drive gear 152 are fixedly provided on the first input shaft 112, and a second speed drive gear 153 and a fourth speed drive gear 154 are fixedly provided on the second input shaft 113. A first speed driven gear 155 meshing with the first speed drive gear 151 and a third speed driven gear 156 meshing with the third speed drive gear 152 are relatively rotatably supported on the output shaft 115, and the first speed driven gear 155 and the third speed driven gear 156 can be selectively connected to the output shaft 115 via a first speed-third speed synchronizing device 157. Furthermore, a second speed driven gear 158 meshing with the second speed drive gear 153 and a fourth speed driven gear 159 meshing with the fourth speed drive gear 154 are relatively rotatably supported on the output shaft 115, and the second speed driven gear 158 and the fourth speed driven gear 159 can be selectively connected to the output shaft 115 via a second speed-fourth speed synchronizing device 160.

A reverse first gear 161 meshing with the second speed driven gear 158 is fixedly provided on the idle shaft 116, a reverse second gear 162 meshing with the first speed drive gear 151 is relatively rotatably supported thereon, and the reverse second gear 162 can be connected to the idle shaft 116 via a reverse dog clutch 163.

A final drive gear 141 fixedly provided on the output shaft 115 meshes with a final driven gear 143 of a differential gear 142. The differential gear 142 is connected to left and right driven wheels W and W via drive shafts 144 and 144.

The second speed drive gear 153, the second speed driven gear 158, the reverse first gear 161, the idle shaft 116, the reverse dog clutch 163, the reverse second gear 162, and the first speed drive gear 151 form reversing means 164 for reversing the rotation of the second input shaft 113 and transmitting it to the first input shaft 112.

Establishment of first speed gear to fourth speed gear positions and a reverse gear position of the automatic transmission M having the above-mentioned arrangement is now explained.

Figure 17:
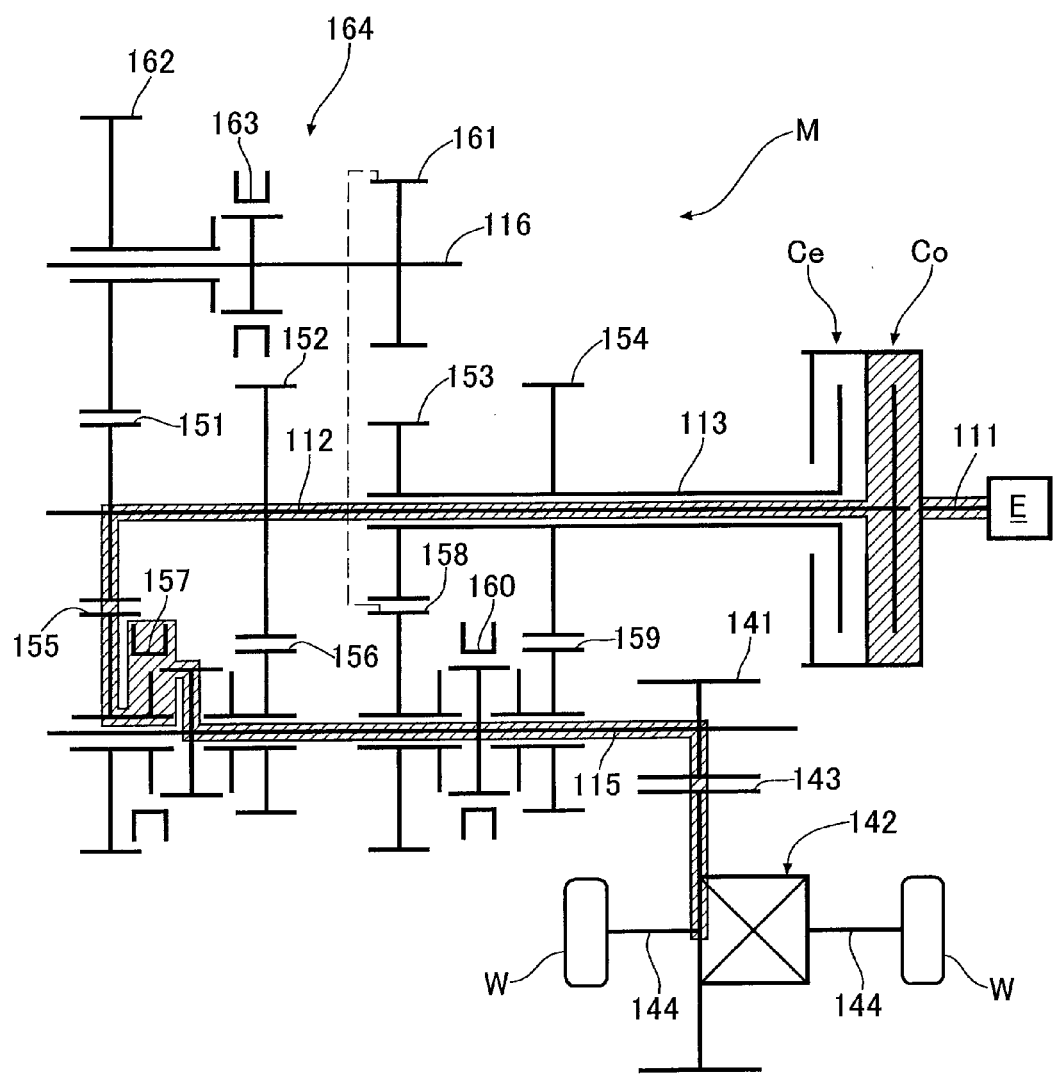
FIG. 17 is a diagram showing a state in which a first speed gear position is established. (fourth embodiment)

As shown in FIG. 17, when establishing the first speed gear position, in a state in which the first speed driven gear 155 is connected to the output shaft 115 via the first speed-third speed synchronizing device 157, the odd-numbered gear clutch Co is engaged so as to connect the drive shaft 111 to the first input shaft 112. In this state, the driving force of the engine E is transmitted to the driven wheels W and W via the path: drive shaft 111→odd-numbered gear clutch Co→first input shaft 112→first speed drive gear 151→first speed driven gear 155→first speed-third speed synchronizing device 157→output shaft 115→final drive gear 141→final driven gear 143→differential gear 142→drive shafts 144 and 144.

When establishing the third speed gear position, in a state in which the third speed driven gear 156 is connected to the output shaft 115 via the first speed-third speed synchronizing device 157, the odd-numbered gear clutch Co may be engaged so as to connect the drive shaft 111 to the first input shaft 112.

When establishing the second speed gear position or the fourth speed gear position, in a state in which the second speed driven gear 158 or the fourth speed driven gear 159 is connected to the output shaft 115 via the second speed-fourth speed synchronizing device 160, the even-numbered gear clutch Ce may be engaged so as to connect the drive shaft 111 to the second input shaft 113.

Figure 18:
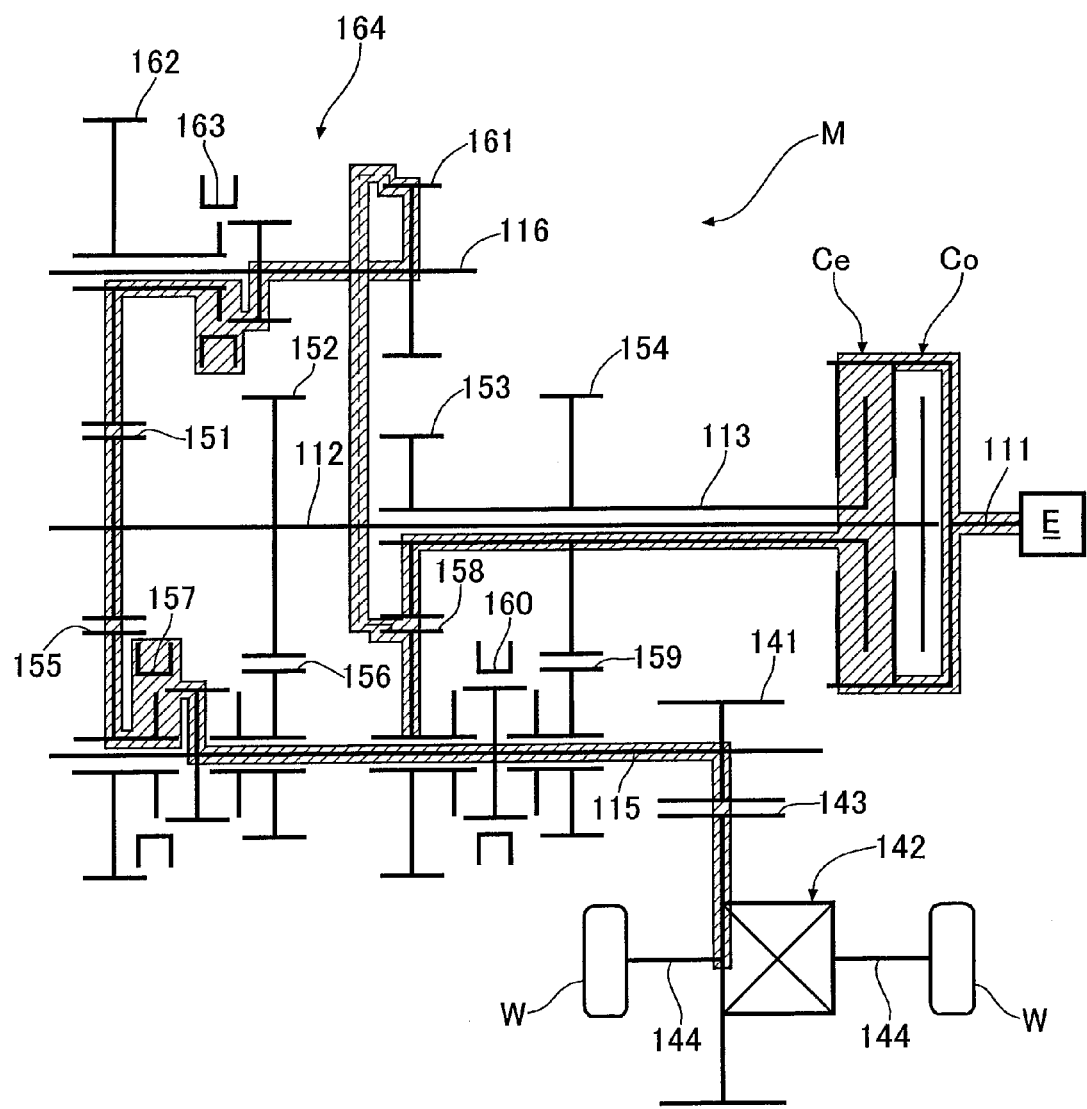
FIG. 18 is a diagram showing a state in which a reverse gear position is established. (fourth embodiment)

As shown in FIG. 18, when establishing the reverse gear position, in a state in which the reverse second gear 162 is connected to the idle shaft 116 via the reverse dog clutch 163 and the first speed driven gear 155 is connected to the output shaft 115 via the first speed-third speed synchronizing device 157, the even-numbered gear clutch Ce is engaged so as to connect the drive shaft 111 to the second input shaft 113. In this state, the driving force of the engine E is reversed and transmitted to the driven wheels W and W via the path: drive shaft 111→even-numbered gear clutch Ce second input shaft 113→reversing means 164→first speed driven gear 155→first speed-third speed synchronizing device 157→output shaft 115→final drive gear 141→final driven gear 143→differential gear 142→drive shafts 144 and 144.

As hereinbefore described, as is clear from a comparison of when the first speed gear position is established in FIG. 17 and when the reverse gear position is established in FIG. 18, since the two gear positions share a long driving force transmission path, that is, first speed drive gear 151→first speed driven gear 155→first speed-third speed synchronizing device 157→output shaft 115→final drive gear 141→final driven gear 143→differential gear 142→drive shafts 144 and 144→driven wheels W and W, the weight and dimensions of the transmission M can be reduced effectively. Since the shared driving force transmission path contains the majority of the driving force transmission path for the first speed gear position, it becomes unnecessary to specially bring in a reduction ratio with the reverse gear position, and the weight and dimensions of the transmission M can be reduced more effectively.

Embodiments of the present invention are explained above, but the present invention may be modified in a variety of ways as long as the modifications do not depart from the spirit and scope thereof.

For example, the automatic transmission M of the embodiment does not include a torque converter, but a torque converter may be provided.

Furthermore, in the embodiment the automatic transmission M is illustrated, but an automated manual clutch may be provided.

Moreover, the odd-numbered gear clutch Co and the even-numbered gear clutch Ce may be used as a starting clutch as well as a transmission clutch.

Furthermore, the odd-numbered gear clutch Co and the even-numbered gear clutch Ce are not limited to single plate dry clutches, and may be multiple plate dry clutches or wet clutches.

The invention claimed is:

1. A transmission comprising
a first input shaft and a second input shaft disposed coaxially with each other,
a first clutch for transmitting the driving force of an engine to the first input shaft
a second clutch for transmitting the driving force of the engine to the second input shaft,
a single output shaft disposed in parallel to the first and second input shafts,
reversing means for transmitting the driving force by reversing the rotational direction between the first input shaft and the second input shaft,
an input gear provided on one of the first and second input shafts, and
an output gear provided on the output shaft and always operatively connected to the input gear,
when establishing a predetermined forward side gear position, the driving force of the engine being transmitted to a driven wheel via one of the first and second clutches the input gear provided on one of the first and second input shafts, and the output gear provided on the output shaft, and when establishing a reverse gear position, the driving force of the engine being transmitted to the driven wheel via the other of the first and second clutches, the other of the first and second input shafts, the reversing means, the input gear provided on said one of the first and second input shafts, and the output gear provided on the output shaft,
an idle shaft and a countershaft are disposed in parallel to the first and second input shafts said other of the first and second input shafts is always operatively connected to the countershaft via a transmission gear train, an intermediate gear provided on the countershaft is always operatively connected to the output gear, and
when establishing a forward side gear position, other than said predetermined forward side gear position, the driving force of the engine is transmitted to the driven wheel via said other of the first and second clutches said other of the first and second input shafts, the transmission gear train, the intermediate gear, and the output gear.

2. The transmission according to claim 1, wherein the transmission has a plurality of gear positions which are divided into two groups, one of the two groups includes the predetermined forward side gear position and the other of the two groups includes the reverse gear position, and wherein a first gear position as a starting gear position is included in the one group and a second gear position is included in the other group.

* * * * *